US011691090B2

(12) United States Patent
Johnson et al.

(10) Patent No.: US 11,691,090 B2
(45) Date of Patent: Jul. 4, 2023

(54) STACKED-PLATE DISTILLATION COLUMN

(71) Applicant: The Johns Hopkins University, Baltimore, MD (US)

(72) Inventors: Phillip I. Johnson, Ellicott City, MD (US); Jonathan P. Jones, Hanover, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 17/465,971

(22) Filed: Sep. 3, 2021

(65) Prior Publication Data

US 2023/0070099 A1    Mar. 9, 2023

(51) Int. Cl.
| | |
|---|---|
| *B01D 3/26* | (2006.01) |
| *B01D 5/00* | (2006.01) |
| *B01D 3/02* | (2006.01) |
| *B01D 3/32* | (2006.01) |

(52) U.S. Cl.
CPC ............ *B01D 5/0015* (2013.01); *B01D 3/02* (2013.01); *B01D 3/26* (2013.01); *B01D 3/324* (2013.01); *B01D 5/006* (2013.01); *B01D 5/009* (2013.01)

(58) Field of Classification Search
CPC ... B01D 3/24; B01D 3/26; B01D 3/28; B01D 3/322; B01D 3/324; B01D 1/221; B01J 19/32; B01J 19/325
See application file for complete search history.

(56) References Cited

U.S. PATENT DOCUMENTS

| | | | | |
|---|---|---|---|---|
| 1,789,059 | A * | 1/1931 | De Colon | B01D 3/26 |
| | | | | 261/114.1 |
| 2,149,943 | A * | 3/1939 | Willem | B01D 3/143 |
| | | | | 196/108 |
| 2,630,305 | A * | 3/1953 | Scofield | B01J 19/32 |
| | | | | 261/DIG. 72 |
| 7,610,775 | B2 | 11/2009 | Tonkovich | |
| 2003/0190461 | A1* | 10/2003 | McKeigue | F25J 3/04678 |
| | | | | 428/184 |
| 2018/0369712 | A1* | 12/2018 | Mnushkin | B01D 3/14 |

OTHER PUBLICATIONS

Foerster et al., In situ monitoring of microfluidic distillation, Chemical Engineering Journal, Dec. 7, 2012, 9 pages, 227 (2013) 13-21, Elsevier, United Kingdom.
Yang et al., A comprehensive review of micro-distillation methods, Chemical Engineering Journal, Nov. 8, 2016, 12 pages, 313 (2017) 1509-1520, Elsevier, Taiwan.

* cited by examiner

*Primary Examiner* — Jonathan Luke Pilcher
(74) *Attorney, Agent, or Firm* — Todd R. Farnsworth

(57) ABSTRACT

A distillation column including a plurality of alternating plates and spacers stacked in a z-direction is provided. The plates include a respective liquid channeling network on a top surface thereof, a respective vapor opening, and a respective descending ramp. The respective descending ramps abut a respective liquid feed location of the plate immediately below to form a continuous liquid channeling network. The respective vapor openings of adjacent plates are located on opposite sides of the distillation column and form a continuous S-shaped vapor channel defined by the plurality of alternating plates and spacers, and the respective vapor openings. Systems including such distillation columns and processes of distilling a fluid mixture are also provided.

17 Claims, 17 Drawing Sheets

1500

Start (i) providing a distillation column comprising a plurality of alternating plates and spacers stacked in a z-direction, the plates comprising a respective liquid channeling network on a top surface thereof, a respective vapor opening, and a respective descending ramp; wherein the respective descending ramp abuts a respective liquid feed location of the plate immediately below to form a continuous liquid channeling network, wherein the respective vapor openings of adjacent plates are located on opposite sides of the distillation column and form a continuous S-shaped vapor channel defined by the plurality of alternating plates and spacers, and the respective vapor openings
1502

(ii) flowing a vapor phase through the continuous S-shaped vapor channel in a first direction
1504

(iii) flowing a liquid phase through the continuous liquid channeling network in a second direction, the second-direction being counter-current to the first direction
1506

(iv) vaporizing a portion of the more volatile component into the vapor phase forming a more volatile component rich vapor phase, and a portion of the less volatile component transferring into the liquid phase forming a less volatile component rich liquid phase; wherein the more volatile component rich vapor phase located at or proximate a top end of the distillation column has a second percentage of the more volatile component, the second percentage of the more volatile component is greater than the first percentage of the more volatile component.
1508

FIGURE 15

STACKED-PLATE DISTILLATION COLUMN

STATEMENT OF GOVERNMENTAL INTEREST

This invention was made with U.S. Government support under Federal Award HR00111620029 awarded by the Defense Advanced Research Projects Agency (DARPA). The government has certain rights in the invention.

TECHNICAL FIELD

Example embodiments relate generally to distillation columns and, in particular, relate to stacked-plate distillation columns that may include a plurality of alternating plates and spacers stacked in a z-direction.

BACKGROUND

Distillation is a process utilized to separate components in a feed mixture based upon, for example, relative boiling points or volatility. A simple, continuous column can make the separation between two components into two product streams. In multi-component systems, the two main components to be separated are designated as the light and heavy keys. The light key is the more volatile component in greater purity in the top product stream, and the heavy key is the less volatile component in greater purity in the bottom product stream. One example starting point upon which column design is based is to accurately determine the relative volatility of the key components to be separated, usually with reference to vapor-liquid equilibrium for the feed mixture.

SUMMARY OF THE DISCLOSURE

Certain embodiments disclosed herein provide a distillation column including a plurality of alternating plates and spacers stacked in a z-direction. In example embodiments, one or more (e.g., each) of the plates include a respective liquid channeling network on a top surface thereof (e.g., formed therein or provided on top of the top surface), a respective vapor opening, and a respective descending ramp. In example embodiments, one or more (e.g., each) of the respective descending ramps may abut a respective liquid feed location of the plate immediately below to form a continuous liquid channeling network. In example embodiments, the respective vapor openings of adjacent plates may be located on opposite sides of the distillation column to form a continuous S-shaped vapor channel defined by the plurality of alternating plates and spacers, and the respective vapor openings.

In an example embodiment, a system may be provided for distilling a fluid mixture including: (i) a distillation column including a plurality of alternating plates and spacers stacked in a z-direction, in which the distillation column further includes a first vapor outlet (e.g., distillate vapor out), a first liquid outlet (e.g., bottoms-liquid out), and a first vapor inlet (e.g., bottoms-vapor in), optionally a liquid feed inlet, and optionally a liquid reflux inlet; (ii) a boiler (e.g., reboiler) having a second liquid inlet and a second vapor outlet, in which the second liquid inlet may be operatively connected to the first liquid outlet and the second vapor outlet may be operatively connected to the first vapor inlet; (iii) a condenser having a third vapor inlet and a third liquid outlet, in which the third vapor inlet is operatively connected to the first vapor outlet; and (iv) the distillation column or the boiler further includes a first fluid mixture inlet, for example, to provide a fresh feed of the fluid mixture to the system from separation. In example embodiments, one or more (e.g., each) of the plates include a respective liquid channeling network on a top surface thereof (e.g., formed therein or provided on top of the top surface), a respective vapor opening, and a respective descending ramp. In example embodiments, one or more (e.g., each) of the respective descending ramp may abut a respective liquid feed location of the plate immediately below to form a continuous liquid channeling network. In example embodiments, the respective vapor openings of adjacent plates may be located on opposite sides of the distillation column and form a continuous S-shaped vapor channel defined by the plurality of alternating plates and spacers, and the respective vapor openings.

In yet another embodiment, a process may be provided for distilling a fluid mixture having a first molecular percentage of a more volatile component and a first molecular percentage of a less volatile component, in which the process includes providing a distillation column including a plurality of alternating plates and spacers stacked in a z-direction, in which one or more (e.g., each) of the plates may include a respective liquid channeling network on a top surface thereof (e.g., formed therein or provided on top of the top surface), a respective vapor opening, and a respective descending ramp. In example embodiments, one or more (e.g., each) of the respective descending ramps may abut a respective liquid feed location of the plate immediately below to form a continuous liquid channeling network. In example embodiments, the respective vapor openings of adjacent plates are located on opposite sides of the distillation column and may form a continuous S-shaped vapor channel defined by the plurality of alternating plates and spacers, and the respective vapor openings. The process may also include flowing a vapor phase through the continuous S-shaped vapor channel in a first direction and flowing a liquid phase through the continuous liquid channeling network in a second direction, in which the second-direction is counter-current to the first direction. The process may also include vaporizing a portion of the more volatile component into the vapor phase forming a more volatile component rich vapor phase, and a portion of the less volatile component transferring into the liquid phase forming a less volatile component rich liquid phase. The more volatile component rich vapor phase located at or proximate a top end of the distillation column may have a second molecular percentage of the more volatile component, in which the second molecular percentage of the more volatile component is greater than the first molecular percentage of the more volatile component.

BRIEF DESCRIPTION OF THE DRAWING(S)

Example embodiments will now be described more fully hereinafter with reference to the accompanying drawings, in which some, but not all embodiments are shown. Indeed, the technology described herein may be embodied in many different forms and should not be construed as limited to the embodiments set forth herein; rather, these embodiments are provided so that this disclosure will satisfy applicable legal requirements. Like numbers refer to like elements throughout, and wherein:

FIG. 15 is a flowchart for a process of distilling a fluid mixture having a first percentage of a more volatile component and a first percentage of a less volatile component in accordance with example embodiments.

DETAILED DESCRIPTION

Figure 1:
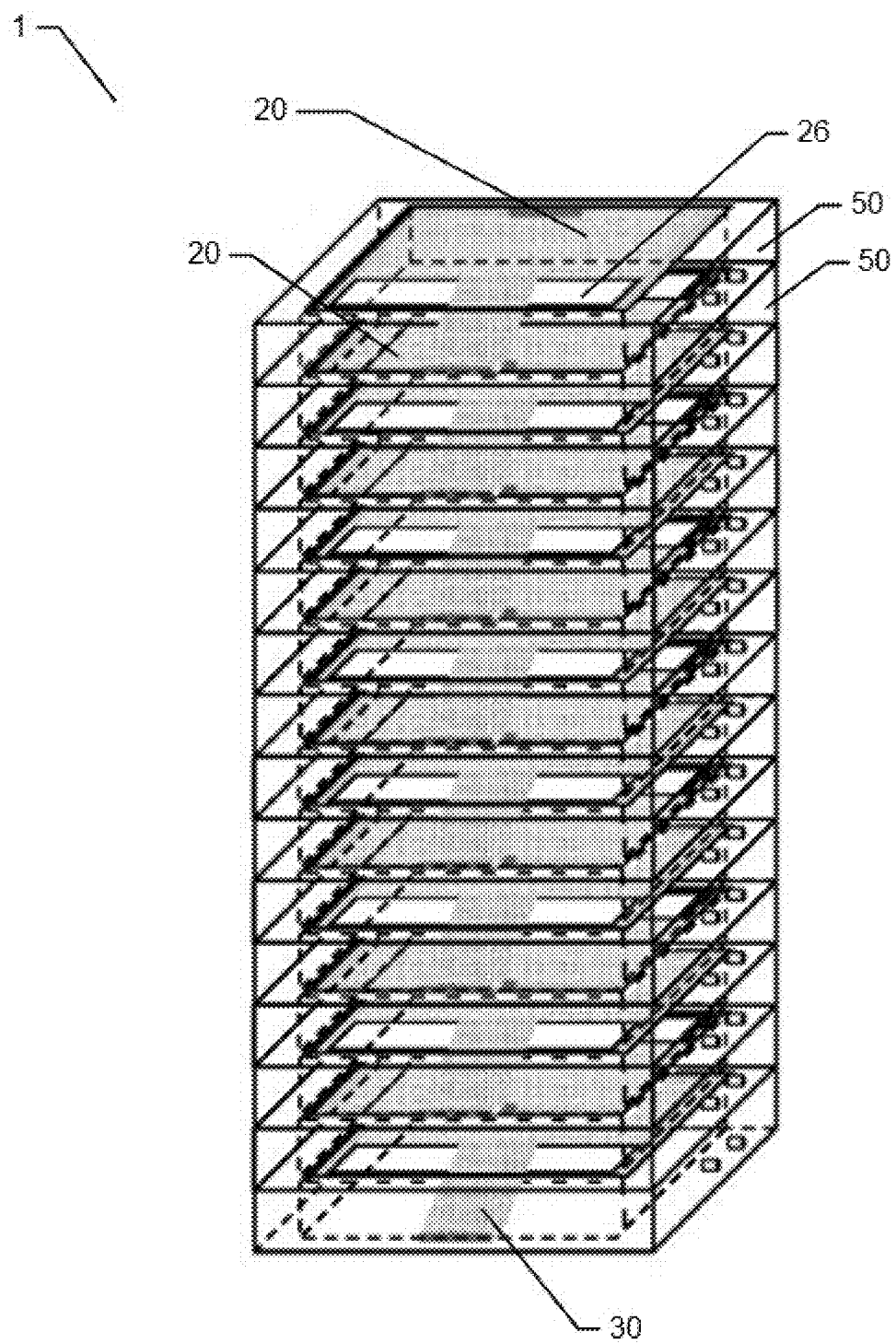
FIG. 1 illustrates a distillation column, in accordance with example embodiments, including a plurality of plates and spacers in which the plates and spacers are stacked in a z-direction in an alternating fashion.

Some example embodiments will be described more fully hereinafter with reference to the accompanying drawings, in which some, but not all example embodiments are shown. Indeed, the examples described and pictured herein should not be construed as being limited to the scope, applicability, or configuration of the present disclosure. Rather, these example embodiments are provided so that this disclosure will satisfy applicable legal requirements. As used in the specification, and in the appended claims, the singular forms "a", "an", "the", include plural referents unless the context clearly dictates otherwise. Like reference numerals refer to like elements throughout.

Example embodiments herein relate generally to distillation columns and, in particular, relate to stacked-plate distillation columns that may include a plurality of alternating plates and spacers stacked in a z-direction. The plates may include a respective liquid channeling network on a top surface thereof, a respective vapor opening, and a respective descending ramp. The respective descending ramps may abut a respective liquid feed location of the plate immediately below to form a continuous liquid channeling network. The respective vapor openings of adjacent plates may be located on opposite sides of the distillation column and may form a continuous S-shaped vapor channel defined by, for example, the plurality of alternating plates and spacers and the respective vapor openings.

Specifying column operating objectives may be a first step in column design. These may be defined by a primary product composition and an optimal recovery of the product from the waste, recycle, or sometimes less important by-product stream. These specifications may be in terms of the heavy key impurity in the top stream and the light key impurity in the bottom stream. Once the top and bottom stream compositions are specified, the dew point of the top stream and the boiling point of the bottom stream may be determined at various pressures. An operating pressure may be selected that allows acceptable temperature differences between available utilities because, in some embodiments, the overhead vapor must be condensed and the bottom liquid reboiled. Atmospheric or pressure operation of the column may be useful to avoid requiring a vacuum system. Another consideration is component heat sensitivity, which may require lower pressure operation to avoid fouling, product discoloration, or decomposition. Often the relative volatility is also improved at lower pressures.

In this regard, the design for a distillation column is often times unique to a given feed mixture (e.g., the components to be separated), and may not be suitable for distillation (or efficient separation) of a different feed mixture with different components for separation.

Example embodiments herein relate generally to a column, such as a distillation column that may have a variety of cross-sectional shapes (e.g., circular, rectangular, etc.), including a plurality of stacked plates with, for example, a spacer located between the plates. In example embodiments, the spacer may be a separate component from the plate. Alternatively, a spacer and a plate may be formed as an integral component (e.g., a stage include a single plate and a single spacer). In example embodiments, one or more physical dimensions of the distillation column may be easily modified by simple addition or removal of a desired number of plates for a given application and/or modification of the height of one or more of the spacers to adjust the vapor head space immediately above one or more plates. For example, the plates and spacers may be simply clamped and/or bolted together in a releasable fashion such that the distillation column can be assembled, disassembled, and/or physically modified (e.g., changing the number of plates, changing the type of plates to have a different liquid channeling network, changing the height of the spacers, etc.). For instance, the plates and spacers may include one or more through holes that are aligned with each other when the plates and spacers are stacked upon one another to form one or more column-through holes that may receive and allow a support bar or bolt therethrough. The support bar or bolt may then be used to tighten and clamp the stacked group of plates and spacers to provide air tight seals between the plurality of plates and spacers to prevent leakage of material being processed within the distillation column from undesirably leaking outside the distillation column between the plates and spacers.

In example embodiments, plates may be, for example, rectangular in shape (other shapes are possible e.g., circular, oval, triangle, pentagon, hexagon, octagon, etc.) and separated from adjacent plates by a spacer that may line the perimeter of the plates. One or more of the plates (e.g., each plate) may include a liquid channeling network either positioned on a top surface thereof (e.g., tack-welded in place, tied to the plate, etc.) or formed within the top surface thereof (e.g., engraved within the top surface to impart a plurality of grooves therein). In example embodiments, the liquid channeling network includes a high surface area that may facilitate continuous channeling of a liquid phase within the distillation column along the top surfaces of the plates within the distillation column. The high surface area, for example, may be provided by micro-engravings within the surface of the respective plates or by use of a mesh or fabric attached to the top surface of the respective plates. In example embodiments, the high surface area liquid channeling network may have an affinity for the liquid phase, such as by surface tension and/or wicking of the liquid phase in a manner that the liquid phase is effectively retained within the liquid channeling network. In this regard, the liquid channeling network prevents the formation of large droplets from being entrained in a vapor head space above the plates, which effectively eliminates any concern of flooding within the distillation column. For example, the top and/or bottom surface of the plates may include a generally flat layer of a high surface area wicking material, such as fiber glass. In such embodiments, for example, the wicking material may absorb the liquid phase that is traversing down the distillation column via hydrostatic pressure, thus preventing the formation of relatively large spherical droplets. Prevention of droplet formation, for instance, keeps the cross-sectional area between the plates (e.g., vapor head space above the plates) as open or unrestricted as possible, which, for example, promotes a more uniform gas flow profile throughout the distillation column, reduces excessive particle entrainment, avoids flood conditions, and leverages the high surface area of the liquid channeling network (e.g., wicking surface) on the plates for amplification of total mass transfer between the liquid and gas phases.

In example embodiments, one or more of the plates (e.g., each of the plates) have a vapor opening (e.g. a rectangular or substantially rectangular opening in the plate) that allows vapor from the vapor head space of the plate immediately below to pass therethrough. One or more of the plates (e.g., each of the plates) may also include a descending ramp that extends from the top surface of the plate downward through the vapor opening and may abut the top surface (e.g., for liquid channeling networks formed in the top surface) or the liquid channeling network (e.g., for liquid channeling networks that are separate from the plate but attached to the top surface of the plate) at a liquid feed location of the plate located immediately below. The descending ramp may also include a liquid channeling network formed or attached to a top and/or bottom surface thereof, in which the liquid channeling network of the descending ramp may be the same or different than that of the plate from which it extends from and/or than that of the plate it abuts. In this regard, the descending ramps facilitate the transfer of the liquid phase from one plate to the next. In example embodiments, the respective vapor openings of adjacent plates are located on opposite sides of the distillation column and form a continuous S-shaped vapor channel defined by the plurality of alternating plates and spacers, and the respective vapor openings. In this regard, the descending ramp of adjacent plates extends toward opposite sides of the distillation column. For example, the descending ramp of a given plate generally extends in a direction opposite that of the descending ramps of the plates immediately above and below such that the liquid phase flows in a zig-zag path along the length of the distillation column. In example embodiments, for instance, the liquid phase flows along a continuous liquid channeling network defined by the respective liquid channeling networks of the individual plates and descending ramps in a first direction (e.g., a 'S' shaped or zig-zag shaped flow path) and the vapor phase flows in a second direction (e.g., a 'S' shaped or zig-zag shaped flow path) that is opposite (e.g., countercurrent) to the first direction. In an example embodiment, the descending ramp of a given plate may not be as large (e.g., wide and/or long) as the vapor opening of the plate from which the descending ramp extends. Accordingly, the vapor phase can flow around the descending ramp and up to the next plate (e.g., the vapor head space above the next plate). By way of example only, the plates may be generally flat and rectangular shape with a pair of opposing long edges and a pair of opposing short edges, in which the liquid channeling network of the plates channels the liquid phase from the liquid feed location that is proximate to one of the short edges towards the opposing short edge, the vapor opening, and the descending ramp. In this regard, plates may be stacked (with the spacers) in a configuration in which the vapor openings of adjacent plates are located at or proximate opposite sides of the distillation column (e.g., in an x-y plane when the plates and spacers are stacked in a z-direction that is perpendicular to the x-y plane). The plurality of plates, for example, may have a rectangular geometry (other shapes are possible e.g., circular, oval, triangle, pentagon, hexagon, octagon, etc.) having an average length and an average width, wherein a ratio between the average length to the average width is from 2:1 to about 100:1, such as at least about any of the following: 2:1, 5:1, 10:1, 15:1, 20:1, 25:1, 30:1, 35:1, 40:1, 45:1, and 50:1, and/or at most about any of the following: 100:1, 95:1, 90:1, 85:1, 80:1, 75:1, 70:1, 65:1, 60:1, 55:1, and 50:1.

In example embodiments, the individual spacer heights can be varied. The height of a spacer, for example, may define a vapor head space between the top surface of a first plate and a bottom surface of a second plate located immediately above the first plate. In this regard, the individual spacer heights may be varied based, at least in part, on the geometry (e.g., length and/or width) of the plates such that the distillation column can realize or exhibit a desired flow regime for the plates (e.g., superficial velocity control of the vapor phase). In example embodiments, a laminar flow regime may be maintained for the vapor phase and/or the liquid phase to allow for domination of molecular mass transport over convective and to increase the residence time for mass transfer throughout the distillation column. In example embodiments, the spacer height in the z-direction may be reduced relative to the width and/or length of the liquid channeling network, which can desirably contribute to the preferable reduction of the length dimension across which mass must transfer from one phase to another (e.g., from the liquid phase to the vapor phase and vice versa). This geometric minimization of maximum mass transfer distance from one phase to another in the z-direction in concert with a wide and/or long liquid channeling network enables a reduced superficial velocity which is believed to contribute to the extraordinary performance of the stacked-plate distillation column disclosed and described herein. In an example embodiment, a prototype was developed where the column (excluding the reboiler/condenser sections) was about 3" in height. In that example, for 8.5 theoretical plates of separation (data from experiments), the height-equivalent theoretical plate (HETP) is 0.35" or 0.009 m, which is about twice the separation efficiency as the best structured packings available in the current art. Additionally, the example prototype column had a higher turndown ratio than available in the current art as typical columns have to operate at one very low flowrate to hit that low HETP whereas the prototype column design operates across a lot more flow rates. Stated somewhat differently, by increasing the vapor residence time and reducing the length over which mass has to transfer from one phase to another for the plates, the system can equilibrate or get close to equilibration for each unit length along the path of flow (e.g., the S-shaped vapor channel). In this regard, increasing the surface area of the liquid channeling network relative to the average spacer height in the z-direction may provide a more efficient transfer of mass between phases along the S-shaped vapor channel and/or the continuous liquid channeling network. Such improved efficiency, for example, may provide a desired separation between components in a significantly smaller footprint or form-factor relative to traditional distillation columns. Additionally, maintaining laminar flow for the vapor phase and/or the liquid phase mitigates or eliminates any concerns of a flooding condition occurring with the distillation column.

In example embodiments, one or more of the spacers (e.g., each of the spacers) may be equipped with one or more ports that may allow an operator to obtain samples and/or analyze conditions (e.g., temperature, pressure, etc.) on one or more plates of interest. For example, a port may be used to obtain gas and/or liquid samples for analysis at a given plate location. Additionally or alternatively, a port or ports may be used to locally heat or cool a given plate, to place a feed location (e.g., fluid mixture to be separated) on any desired plate, and/or to place a reflux inlet port at any given plate.

In example embodiments, the stacked plates and spacers may, for example, be assembled with several rods through holes drilled around the perimeter of the plates and spacers, then sealed together tightly using gaskets, nuts, and washers. In this regard, the spacers and the plates have individual through holes that align with when stacked. The rods, for instance, may pass through the aligned through holes of the spacers and plates to enable clamping or compaction of the spacers and plates upon each other upon tightening with one or more nuts.

In example embodiments, the top plate (e.g., the uppermost plate) and the bottom plate (e.g., bottommost plate) of the stacked plates may be unique compared to the other plates in the distillation column in that they facilitate phase separation at the outlets of the distillation column (e.g., liquid outlet of the distillation column to a boiler/reboiler and/or the vapor outlet of the distillation column to a condenser). The top plate (e.g., the uppermost plate), for instance, may be positioned to have an angle in a manner to promote gas flow towards a given outlet (e.g., vapor outlet of the distillation column to a condenser), such as an angle relative an x-y plane from about 3° to about 60°, such as at least about any of the following: 3, 5, 10, 15, 20, 25, and 30°, and/or at most about any of the following: 60, 55, 50, 45, 40, 35, and 30°. For example, one end of the top plate may be angled towards a given outlet (e.g., vapor outlet of the distillation column to a condenser) while liquid (e.g., reflux) may enter the top of the distillation column at the other side of the distillation column and begin flowing through the distillation column via the continuous liquid channeling network. Conversely, the bottom plate (e.g., bottommost plate) may be provided in an angled configuration to promote liquid phase flow through the liquid channeling network thereof without excessive pooling and out through a given port (e.g., liquid outlet of the distillation column to a boiler/reboiler) via hydrostatic pressure while vapor is inserted through a separate port (e.g., vapor inlet of the distillation column that is operatively connected to a boiler/reboiler) elevated above the liquid level in the liquid channeling network of the bottom plate, such as an angle relative an x-y plane from about 3° to about 60°, such as at least about any of the following: 3, 5, 10, 15, 20, 25, and 30°, and/or at most about any of the following: 60, 55, 50, 45, 40, 35, and 30°. In this regard, one or more (e.g., each and every) plate located between the top plate (e.g., uppermost plate) and the bottom plate (e.g., bottommost plate) may be located in respective x-y planes that are perpendicular to the z-direction while the top plate and/or the bottom plate are not located in an x-y plane that is perpendicular to the z-direction.

In example embodiments, the distillation column may be incorporated in to numerous processing systems, which may include traditional or custom condensers, reboilers, pumps, valves, transport lines, etc. that can be used to facilitate the remainder of the distillation process outside of the high efficiency stacked plate continuous liquid channeling (e.g., continuous wicking) surface distillation column. In example embodiments, the distillation column and and/or all relevant parts may be well insulated to promote energy efficiency. In example embodiments, for example, heating and cooling elements may be constructed into one or more (e.g., each) plate to allow a user or operator to significantly expedite start up time and equilibration of a desired temperature gradient across the distillation column while improving heating efficiency.

In example embodiments, the continuous liquid channeling network descending from plate to plate having a generally zig-zag flow path and the continuous 'S'-shaped vapor channel facilitates continuous distillation-type separation of chemical mixtures in a significantly smaller form factor than any known related designs on the market. In this regard, the distillation column in example embodiments exhibit a significantly smaller pressure drop than any known related designs on the market (e.g., the low pressure drop may be a result of the lack of flow restriction across the unit and open channels). Furthermore, example embodiments of the distillation column may leverage flow regime control to optimize mass transfer in a way that is different from any known related designs on the market. For instance, controlling the superficial velocity of the vapor phase to utilize a Stokes or laminar flow regime may increase the residence time of the vapor phase through the distillation column and facilitate efficient mass transfer from the vapor phase to the liquid phase and vice versa. Additionally, the distillation column in example embodiments allows the user or operator to rapidly set a desired number of actual or theoretical plates for a desired separation, pull instrumental data for any or all plates on the column for process control/diagnostics, rapidly select feed/reflux locations along the length of the distillation column, and customize a distillation column rapidly for a desired separation process.

Example embodiments of a distillation column include a plurality of alternating plates and spacers stacked upon each other in a z-direction. In example embodiments, one or more (e.g., each) of the plates include a respective liquid channeling network on a top surface thereof (e.g., formed therein or provided on top of the top surface), a respective vapor opening, and a respective descending ramp. In example embodiments, one or more (e.g., each) of the respective descending ramps abut a respective liquid feed location of the plate immediately below to form a continuous liquid channeling network. In example embodiments, the respective vapor openings of adjacent plates are located on opposite sides of the distillation column and form a continuous S-shaped vapor channel defined by the plurality of alternating plates and spacers, and the respective vapor openings.

Figure 2:
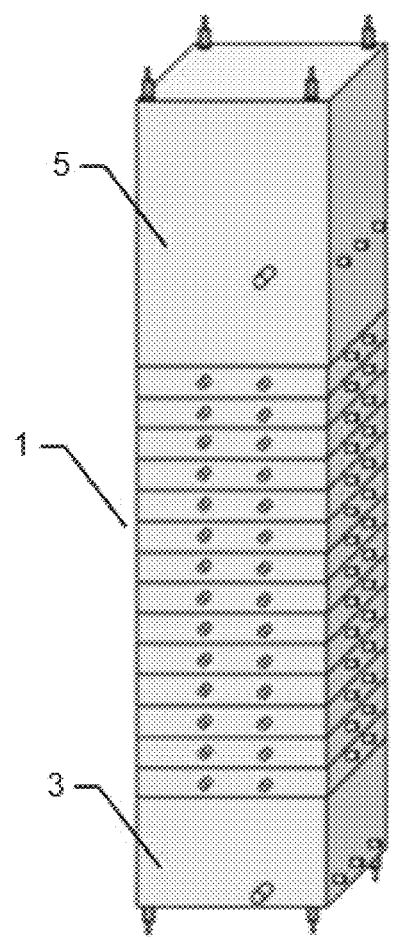
FIG. 2 illustrates a distillation column operatively coupled to a reboiler and an overhead condenser in accordance with example embodiments.

FIG. 1, for instance, illustrates a distillation column 1 including a plurality of plates 20 and spacers 50, in which the plates and spacers are stacked in a z-direction in an alternating fashion. The distillation column 1 of FIG. 1 illustrates the spacers as being transparent so that the alternating orientation of vapor openings 26 of adjacent plates are illustrated as evident by a first set of vapor openings adjacent or proximate to the front side of the distillation column and a second set of vapor opening adjacent or proximate to the back side of the distillation column, in which a plate having a vapor opening adjacent or proximate to the front side of the distillation column has a plate immediately above and another plate immediately below that have a respected vapor opening adjacent or proximate to the back side of the distillation column. In this regard, the respective vapor openings of the plates may be positioned in an alternating fashion to provide an S-shaped vapor channel through the distillation column. Similarly, the distillation column of FIG. 1 illustrates that the descending ramps 30 associated with adjacent plates extend towards opposite sides of the distillation column. The plates may include a liquid channeling network that facilitate flow of a liquid phase along the plates, down the descending ramps, and to a boiler (reboiler) if desired. In this regard, the respective liquid channeling network of the plates and descending ramp, which may abut a respective liquid feed location of a plate immediately below, may define a continuous liquid channeling network along the length of the distillation column. FIG. 2 illustrates a distillation column 1 operatively coupled to a reboiler 3 and an overhead condenser 5.

Figure 3:
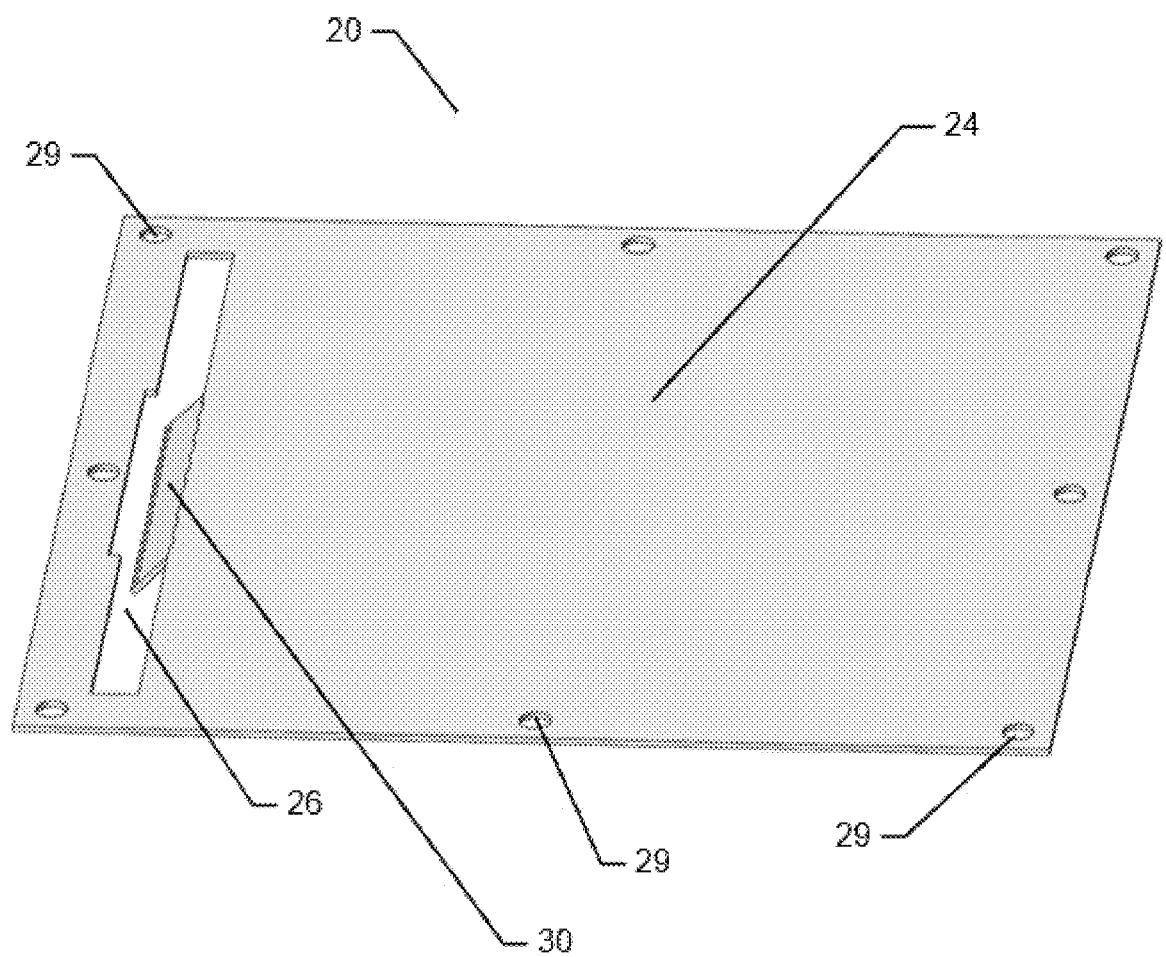
FIG. 3 illustrates a plate in accordance with example embodiments.
Figure 4:
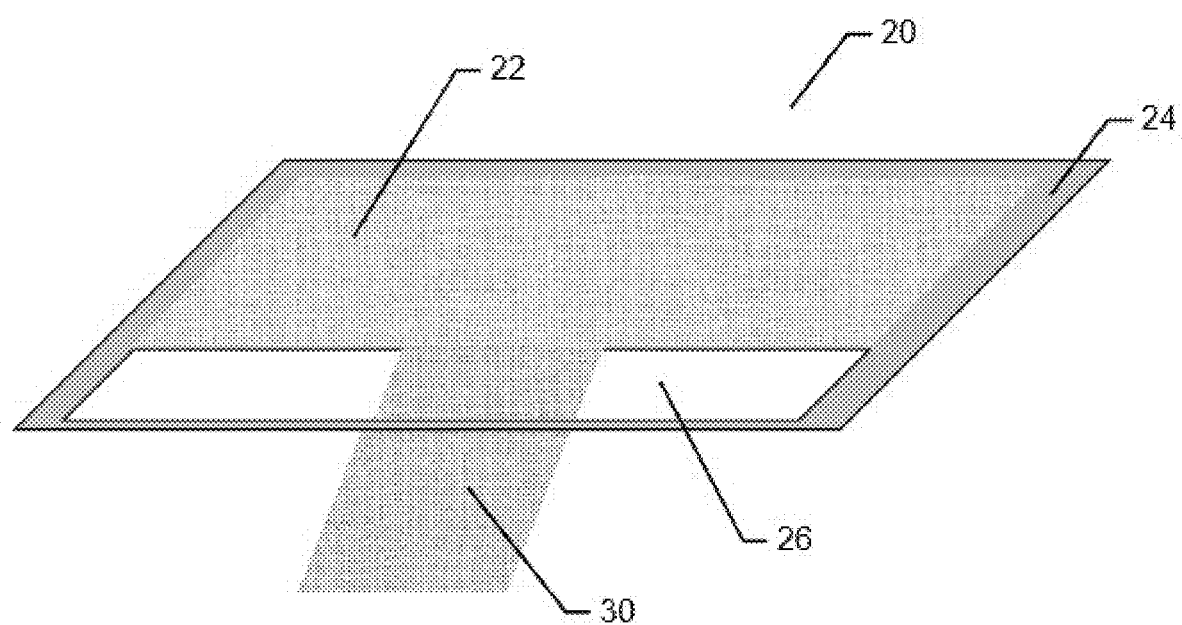
FIG. 4 illustrates a plate including a liquid channeling network disposed on the top surface of the plate in accordance with example embodiments.

FIG. 3 illustrates a plate 20 in example embodiments. The plate 20 of FIG. 3 illustrates the top surface 24, the vapor opening 26, and the descending ramp 30 that extends outwardly and downwardly from the top surface. In this regard, the vapor opening 26 enables a vapor phase from a plate immediately below to pass therethrough and contact a liquid phase flowing across the top surface 24 and down the descending ramp 30. FIG. 3 also illustrates optional through holes 29 that may receive attachment rods or bolt to facilitate connection with spacers and additional plates. FIG. 4 illustrates a plate 20 including a liquid channeling network 22 disposed on the top surface 24 of the plate. FIG. 4 also provides an additional illustration of the vapor opening 26 and the descending ramp 30 including the liquid channeling network.

Figure 5:
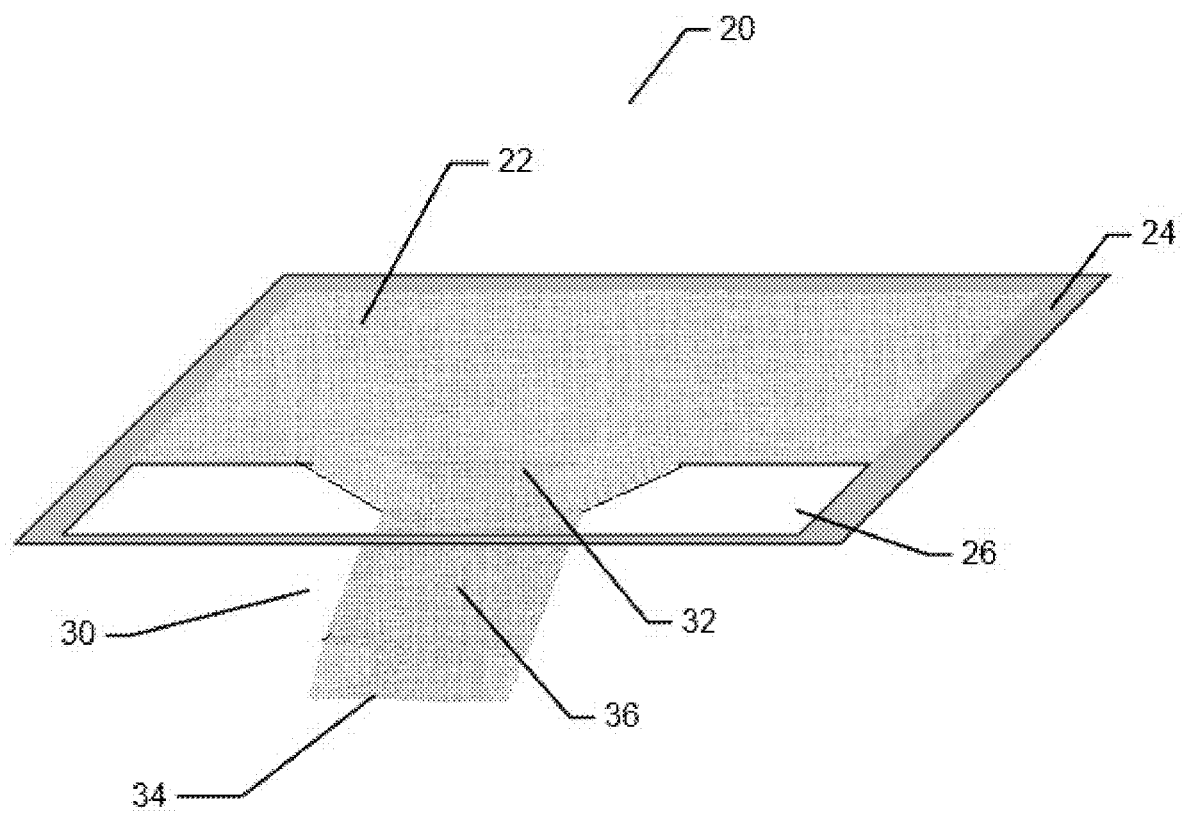
FIG. 5 illustrates a plate including a descending ramp in accordance with example embodiments.
Figure 6:
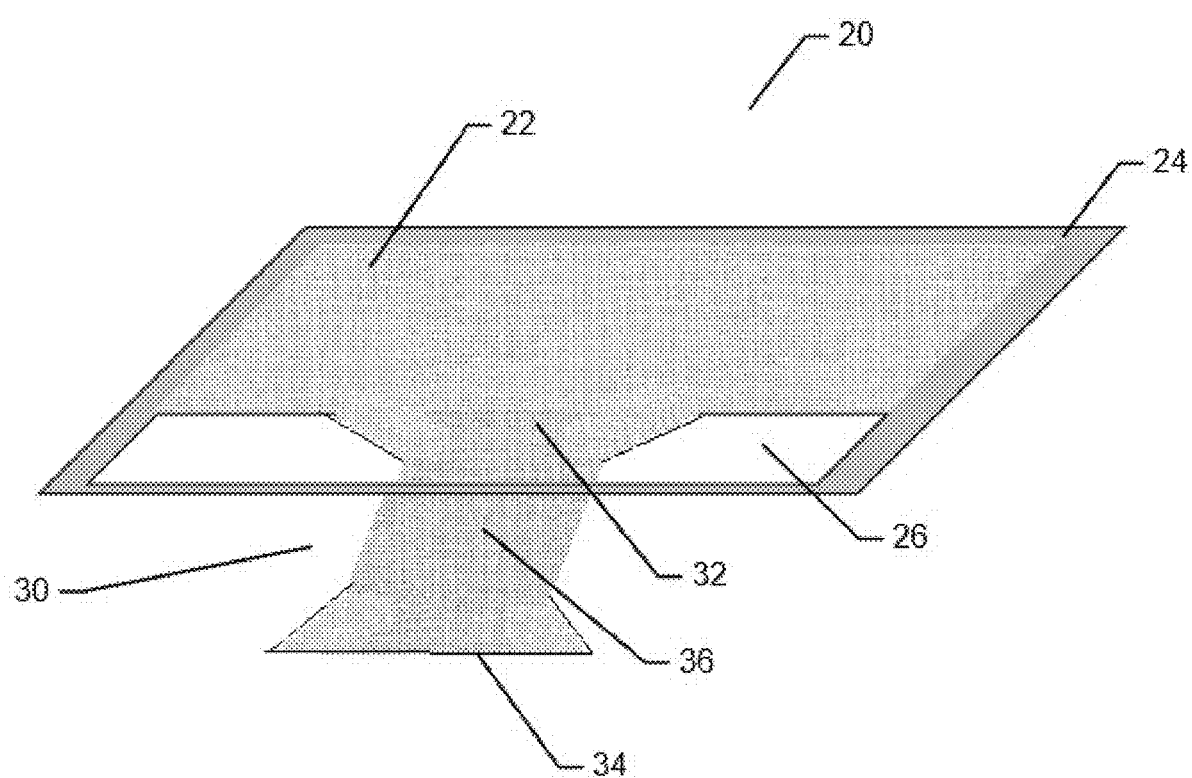
FIG. 6 illustrates an additional plate in accordance with example embodiments.

Although FIGS. 3 and 4 illustrate the descending ramp as a having a uniform rectangular shape or configuration, the descending ramp portion may have a variety of configurations. For example, the descending ramp may actually include a plurality of smaller sized rectangular configuration, such as a comb-structure. In example embodiments, for example, the respective descending ramps may include at least a first respective descending ramp having comb-like structure having a plurality of rectangular descending portions. Additionally or alternatively, the respective descending ramps may include at least a first respective descending ramp having a first end proximate a first plate having a first width, a second end distal the first plate and having a second width, and a middle portion having a third width, in which the first width is larger than the second width, the third width or both. FIG. 5, for instance, illustrates a plate 20 including a descending ramp 30 including a first end 32 proximate first plate 20 having a first width, a second end 34 distal first plate 20 and having a second width, and a middle portion 36 having a third width, in which the first width is larger than the second width and the third width. In example embodiments, the second width may be less than the first width. FIG. 6 illustrates an additional plate 20 including a descending ramp 30 in which the middle portion 36 has a third width that is less than the first width of the first end 32 and the second width of the second end 34. In example embodiments, the first width and the second width are each larger than the third width.

In example embodiments, the descending ramp 30 is sized relative to the vapor opening such that a gas phase flowing past and/or around the descending ramp limits the formation of eddys. The prevention of the formation of eddys, for example, may be achieved by forming the vapor openings with an area (e.g., open area) that is larger than the area of the descending ramp as described below. In this regard, the linear velocity of the vapor phase traveling around and paste the descending ramp is maintained low (e.g., low superficial velocity as described herein). In example embodiments, for example, the respective vapor openings include an average open area and the respective descending ramps include an average descending ramp-area, in which the average descending ramp-area is less than the average open area. In example embodiments, the average descending ramp-area may include from about 5% to about 95% less than the average open area, such as at least about any of the following: 5, 10, 15, 20, 25, 30, 35, 40, 45, and 50% less than the average open area, and/or at most about any of the following: 95, 90, 85, 80, 75, 70, 65, 60, 55, and 50% less than the average open area. In an example embodiment, increasing ramp area may increase system pressure drop by creating a gas flow restriction at each ramp location.

In example embodiments, the respective liquid channeling network of plate 20 may include a plurality of channels formed in the top surface, a mesh material disposed on the top surface, and a fabric material disposed on the top surface. In this regard, the respective liquid channeling network of a given plate may also extend along the top surface of the descending ramp associated therewith. The respective liquid channeling network of one or more (e.g., each) plate includes a plurality of channels formed in the top surface, wherein the plurality of liquid channels include a plurality of separate and distinct channels. Additionally or alternatively, the respective liquid channeling network of one or more (e.g., each) plates may include a plurality of channels formed in the top surface, wherein the plurality of liquid channels includes a plurality of intersection points to define a plurality of interconnected channels. For example, the respective liquid channeling network may be formed by engraving the top surface of the plate (and the descending ramp of the plate). In example embodiments, the plurality of channels may have a variety of dimensions based, for example, on the chemical mixture being processed or separated. Based on the particular chemical mixture being processed or separated, for example, the (i) average depth of plurality of channels (ii) average width at the top surface of the plurality of channels, or (iii) both (i) and (ii) may be varied to facilitate the desired volumetric liquid flowrate whilst also permitting counter flow between the vapor and liquid phases without droplet formation, flooding, or otherwise blockage of the gas flow.

Figure 7:
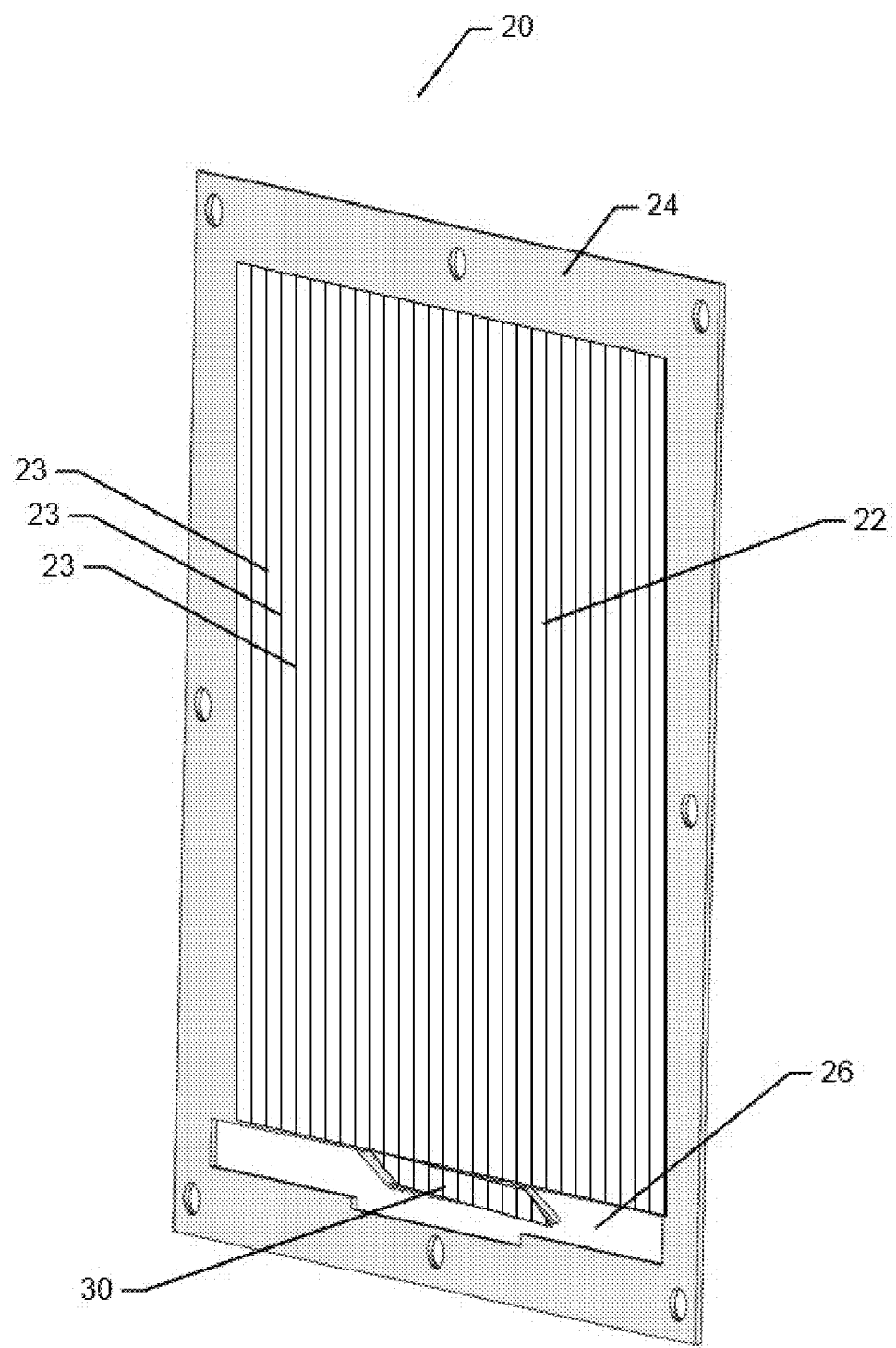
FIG. 7 illustrates a plate including a liquid channeling network including a plurality of channels formed in the top surface in accordance with example embodiments.
Figure 8:
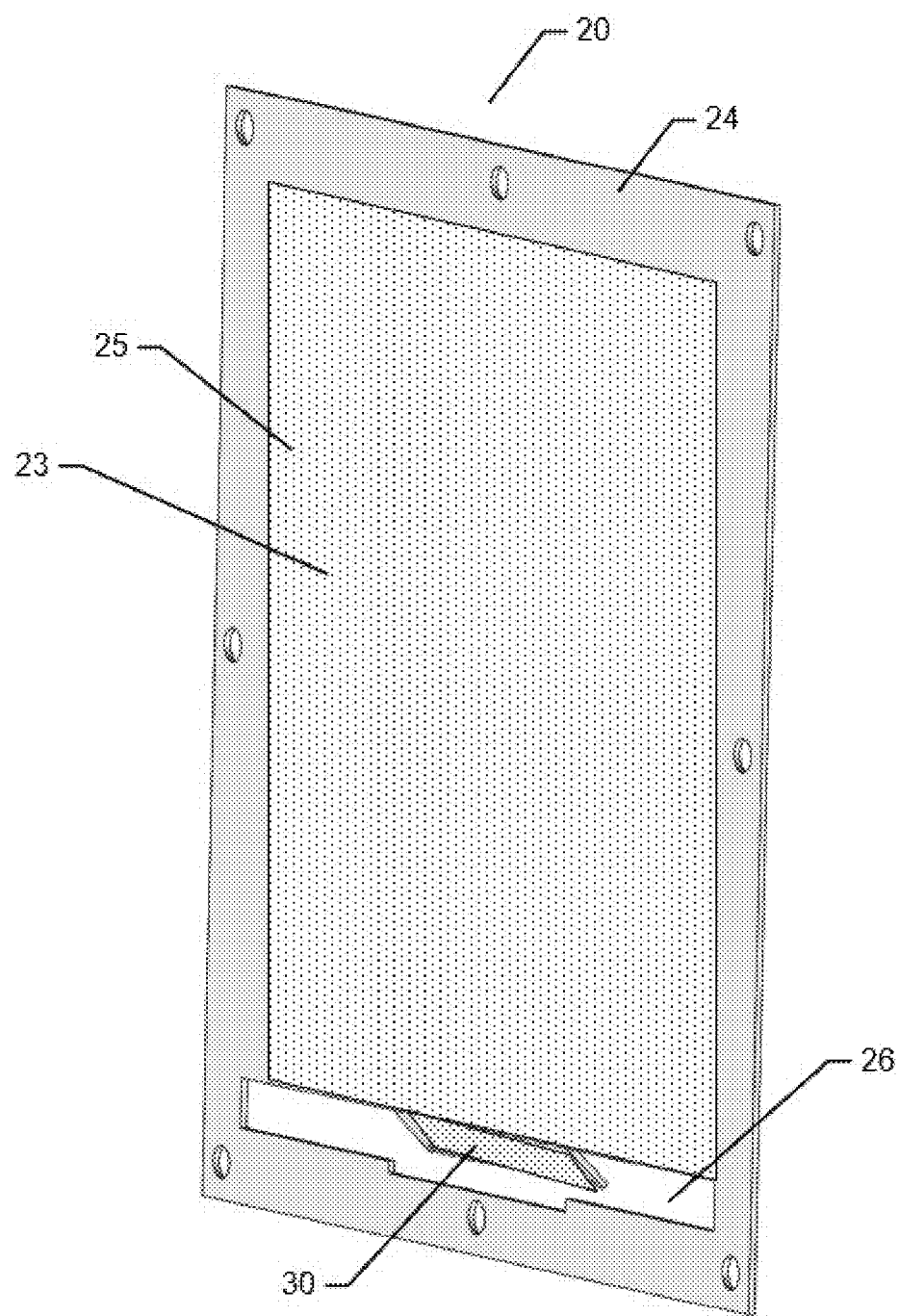
FIG. 8 illustrates a plate including a liquid channeling network including a continuous recessed area surroundings a plurality raised islands in accordance with example embodiments.
Figure 9:
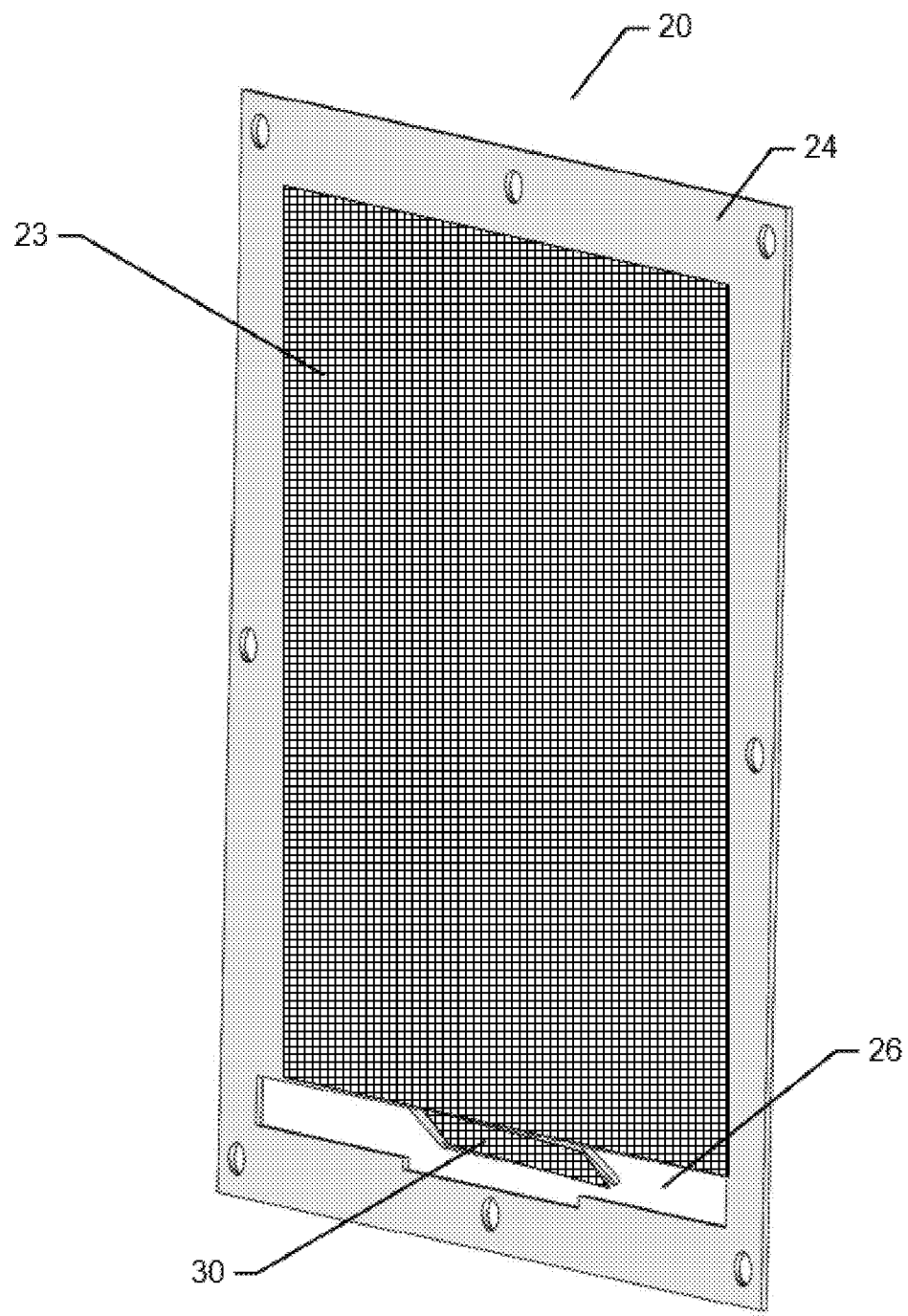
FIG. 9 illustrates a plate including a liquid channeling network including a plurality of channels formed in the top surface, in which the plurality of liquid channels include a plurality of intersection points to define a plurality of interconnected channels in accordance with example embodiments.

FIG. 7, for instance, illustrates a plate 20 including a liquid channeling network 22 including a plurality of channels 23 formed in the top surface, wherein the plurality of liquid channels include a plurality of separate and distinct channels through which the liquid phase may travel. FIG. 8 illustrates a plate 20 including a liquid channeling network with a continuous recessed area 23 surroundings a plurality raised islands 25, in which the liquid phase may travel through the continuous recessed area. FIG. 9 illustrates a plate 20 including a liquid channeling network with a plurality of channels 23 formed in the top surface, in which the plurality of liquid channels include a plurality of intersection points to define a plurality of interconnected channels.

In example embodiments, the respective liquid channeling network of the plates may include a mesh material attached to the top surface. The mesh material may be made from a variety of materials, such as a fiberglass mat of glass fibers, synthetic polymer fibers (e.g., woven or nonwoven fabric, mat of fibers, etc.), a stainless steel, a HASTELLOY, or a corrosion-resistant nickel alloy such as nickel-chromium-iron-molybdenum. In example embodiments, the materials forming the mesh material may not be particularly limited as long as the materials are compatible with the chemicals being processed in the distillation column and capable of facilitating counter flow between phases (e.g., the liquid and vapor phases) in the desired geometry. For example, without the channeling materials, a liquid stream may form trickling pathways of greater height and unpredictable paths across a given plate. With the channeling materials, the liquid spreads out across the plate and stays out of the way of the gas flow. In example embodiments, the mesh material may include a variety of structures that facilitate retention and/or channeling of the liquid phase through the distillation column. For example, the mesh material may include a structured mesh having a plurality of nodes and opening elements. For example, the opening elements may include orthogonal quadrilateral (2D) opening elements, orthogonal hexahedral (3D) opening elements, or both. Additionally or alternatively, the mesh material may include an unstructured mesh having a plurality of nodes and opening elements, in which the opening elements optionally include non-orthogonal opening elements, such as triangular (2D) opening elements, arcuate (2D) openings, or tetrahedra (3D) opening elements. In example embodiments, the plurality of nodes may be defined by intersecting components of the mesh material. In example embodiments, the mesh material may include a wide range of surface areas. For example, a wide range of chemical mixtures can be processed through stacked-plate distillation columns disclosed and described herein, for which a wide variety of surface tensions and viscosities are possible. In this regard, one can gauge the efficacy of a given mesh material in terms of chemical compatibility, flowability (e.g., how much liquid flow does it facilitate per unit cross section of mesh material), and the desired volumetric flowrate of liquid at a given stage. For example, if the cross section of a mesh material is multiplied by the flowability of the mesh material with the liquid mixture it will transport is less than the total liquid flowrate it will encounter, then the liquid will form layers on top of the liquid channeling network and therefore reduce the gas flow cross section and increase gas flow superficial velocity. Such generally undesirable results change the dynamics of the distillation column away from what one may consider more efficient as described and disclosed herein. In example embodiments, the mesh material may include a height in the z-direction and/or a density that can be varied in view of the foregoing considerations. For example, the height and/or density of the mesh material may be varied independently from each other based, at least in part, on achieving a desired liquid flowrate through the mesh material.

In example embodiments, the respective liquid channeling network of the plates may include a fabric material attached to the respective top surface. The fabric, for instance, may include a woven material or a nonwoven material. The nonwoven fabric may be formed from a variety of materials, and may be selected to absorb and/or wick the liquid phase throughout the fabric to channel the liquid phase downward through the distillation column. For example, the fabric material may include a plurality of fibers formed from a synthetic polymeric material, glass fibers, or a combination thereof. The fabric material, for example, may have a basis weight from about 5 grams-per-meter squared (gsm) to about 1500 gsm, such as at least about any of the following: 5, 25, 50, 75, 100, 150, 200, 250, 300, 350, 400, 450, and 500 gsm, and/or at most about any of the following: 1500, 1400, 1300, 1200, 1100, 1000, 900, 800, 700, 600, and 500 gsm. Other example embodiments may also be possible with other basis weight depending on, for example, the material density.

In example embodiments, the respective liquid channeling network of one or more (e.g., each) plate may include a topical coating applied thereto. The topical coating, for example, may modify the polarity of the respective liquid channeling network of the plate to be more or less polar or more or less non-polar to increase tendency of the liquid phase to, for example, absorb, wick, and/or be retained within the liquid channeling network. In this regard, the liquid phase while being channeled through the distillation column is less likely to form large liquid droplets that are entrained in the vapor phase that is passing in a countercurrent direction.

Figure 10A:
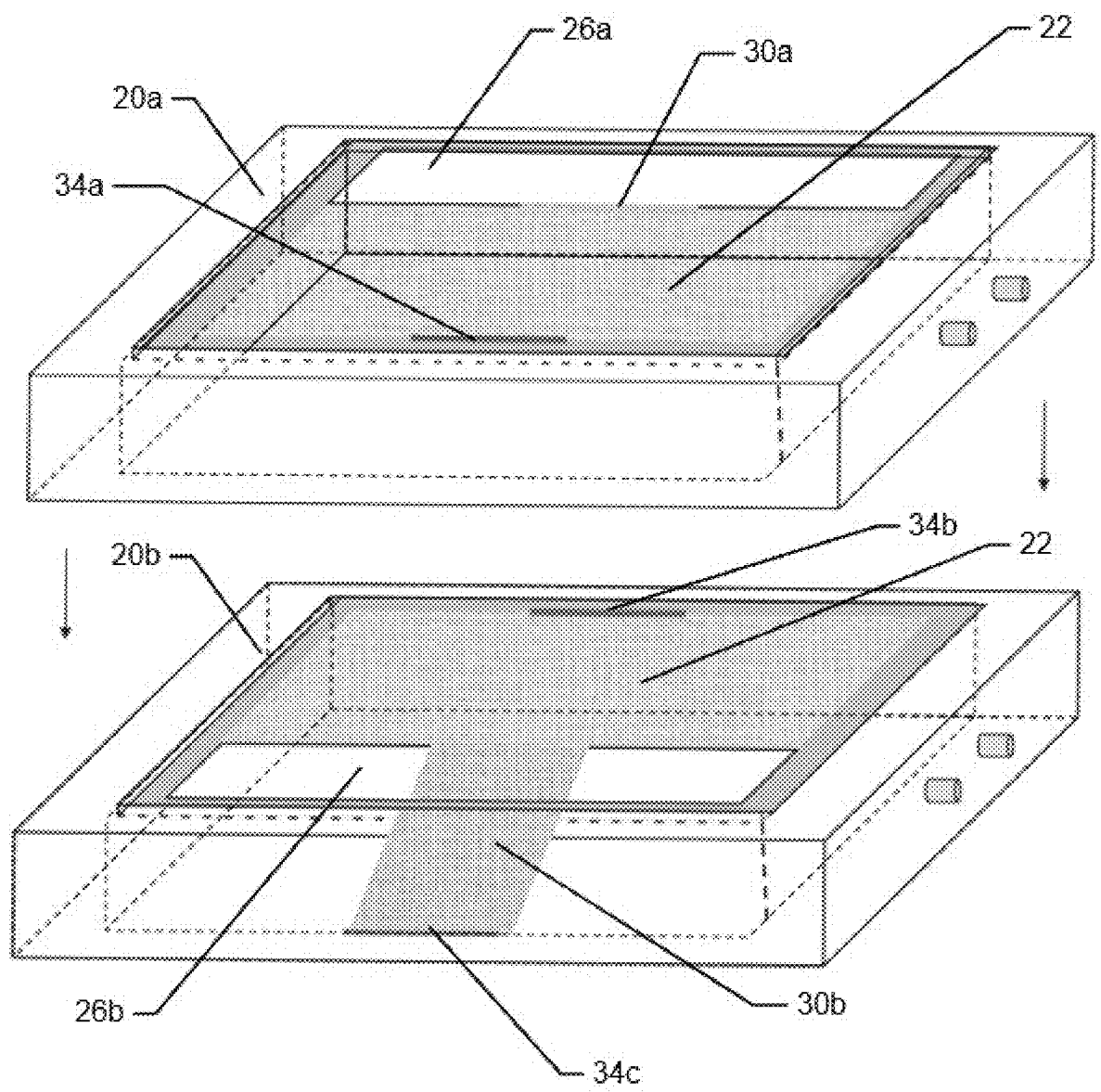
FIG. 10A illustrates a first plate and a second plate prior to being stacked via a spacer in accordance with example embodiments.
Figure 10B:
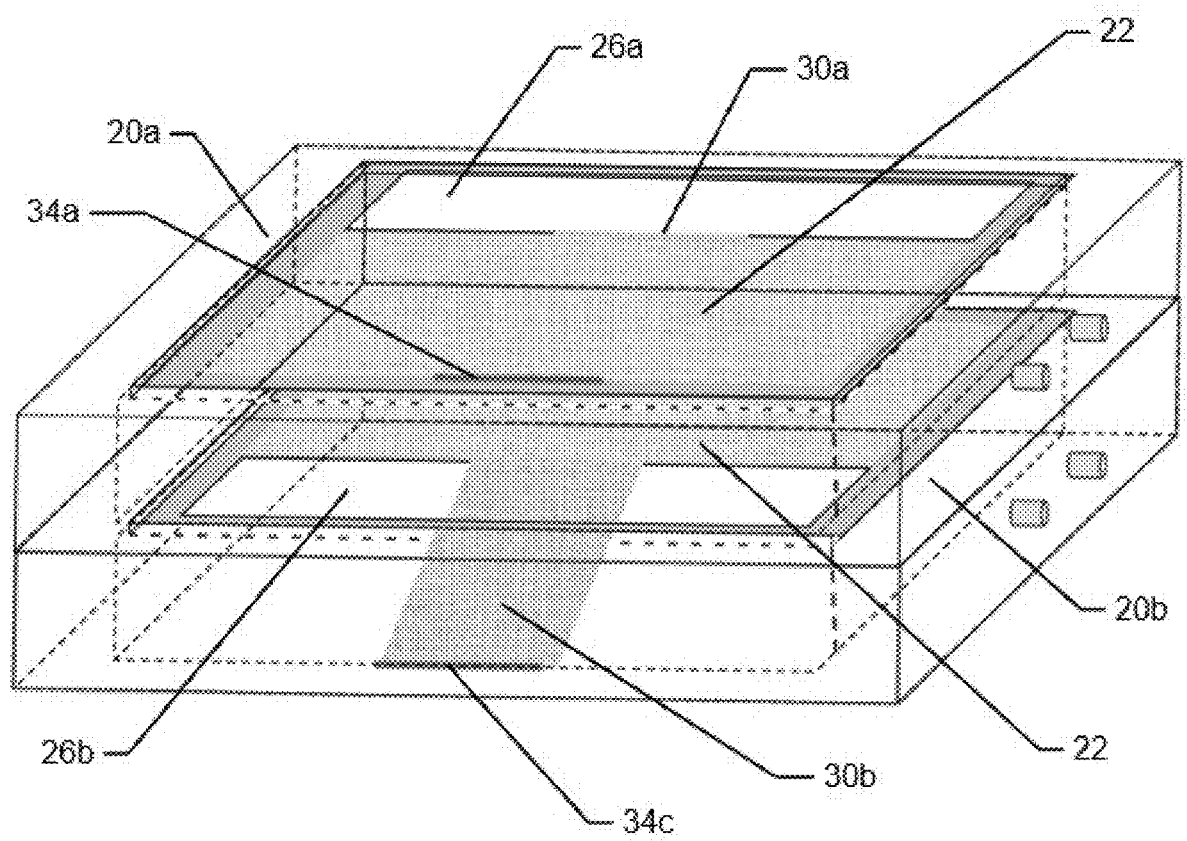
FIG. 10B illustrates the first plate and the second plate of FIG. 10A in a stacked configuration in accordance with example embodiments.

FIG. 10A illustrates a first plate 20a and a second plate 20b prior to being stacked upon each other via a spacer. The first plate 20a includes a first respective liquid feed location 34a where liquid phase from an overhead plate via an overhead descending ramp (not shown) deposits liquid phase onto the first plate 20a. The first plate 20a also includes a first vapor opening 26a and a first descending ramp 30a (extends downwardly and into the page on FIG. 10A). Similarly, second plate 20b includes a second respective liquid feed location 34b where liquid phase from descending ramp 30a will deposit the liquid phase onto the second plate. The second plate 20b also includes a second vapor opening 26b and a second descending ramp 30b (extends downwardly and out of the page on FIG. 10A). FIG. 10B illustrates first plate 20a and the second plate 20b in a stacked configuration.

In example embodiments, spacer 50 has an average thickness or height in the z-direction (e.g., the distance between adjacent plates) that may be varied based upon the desired vapor flow rate through the S-shaped vapor channel. For example, increasing the average thickness or height in the z-direction may reduce the velocity of the vapor phase through the S-shaped vapor channel, which may improve mass transfer between the vapor and liquid phases as described herein. That is, the average thickness or height in the z-direction may be selected to improve mass transfer between the vapor and liquid phases, such as by selecting or modifying the average thickness or height in the z-direction based on the desired reduction of superficial velocity of the vapor phase and to reduce the maximum length for mass transfer from one phase to another. In this regard, the average thickness or height in the z-direction of the spacers may be based, at least on part, on the width and or length of the liquid channeling network of the plates in a manner in which total mass transfer distance is reduced (e.g., vapor channel height reduction). The thickness in the z-direction may define a vapor head space of an associated plate. That is, the vapor head space of a given plate may extend from a top surface and/or liquid channeling network (e.g., mesh or fabric) to a bottom surface of a plate immediately above the given plate. In example embodiments, the spacers may include one or more ports as discussed above. The spacers, in example embodiments, may include a frame-like structure and encircles and/or overlies the perimeter of the plate. In this regard, the spacer 50 may include one or more though holes that align with those of the plates when stacked.

In an example embodiment described herein, column dimensions may be optimized through, for example, the following example formula where increasing values may increase performance, but the ability to increase performance may be defined by the spatial availability and/or level of investment and/or chemicals to be separated:

$$\phi = \frac{D_{AB}X}{v_xZ^2} = \left(\frac{\rho D_{AB}}{\dot{m}}\right)\frac{XY}{Z}$$

The components in the above example parenthetical notation may be specific to a particular use (e.g., the materials being distilled). For example, X may be equal to the path length of a single plate. In an example embodiment, phi greater than 0.5 may achieve results exceeding conventional techniques (a sample prototype embodiment yielded a phi of roughly 0.5 to 1.8 with distillation results better than achieved through conventional techniques). The value $\phi$ may be a ratio of diffusive and bulk transport rates that may serve as a critical design metric. In one embodiment, $D_{AB}$, $\rho$, $\dot{m}$, $v_x$, X, Y, and Z may refer to the molecular diffusivity, density, mass flowrate, superficial gas velocity, gas flow path length, gas flow channel width, and gas flow channel height. On the far right hand side of the above equation, for example, the relative time ratio may be expressed as a ratio of the convective to the diffusive times as noted above. The separation process performance may improve when $\phi$ is maximized. The values present in the $$\frac{\rho D_{AB}}{\dot{m}}$$

component of $\phi$ may change with respect to system conditions limited by the user or operator and/or the desired separation process. The user or operator may seek to minimize the height Z to some height above a threshold wherein further reductions in Z result in flood conditions, undesired pressure changes, etc. Dimensions X and Y may be maximized to the form-factor limits defined by the user or operator. Modifications and other embodiments of the equation illustrated above may come to mind to one skilled in the art to which these inventions pertain having the benefit of the teachings presented herein.

Figure 11A:
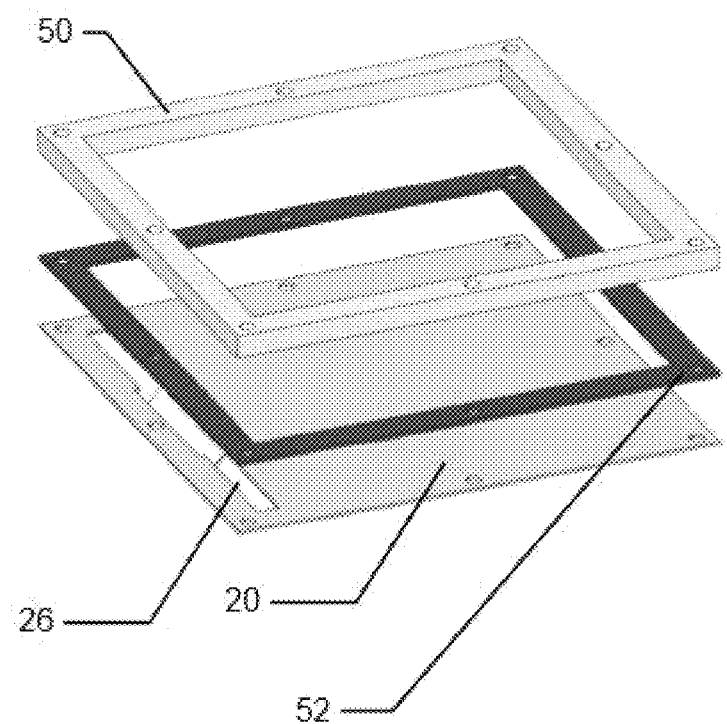
FIG. 11A illustrates an unassembled grouping of a spacer, an optional gasket, and a plate in accordance with example embodiments.
Figure 11B:
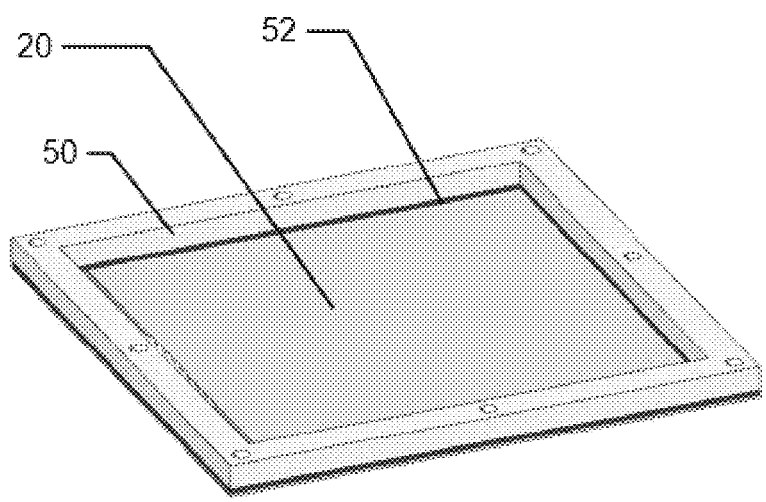
FIG. 11B illustrates the assembled grouping of the spacer, the optional gasket, and the plate of FIG. 11A in accordance with example embodiments.
Figure 12A:
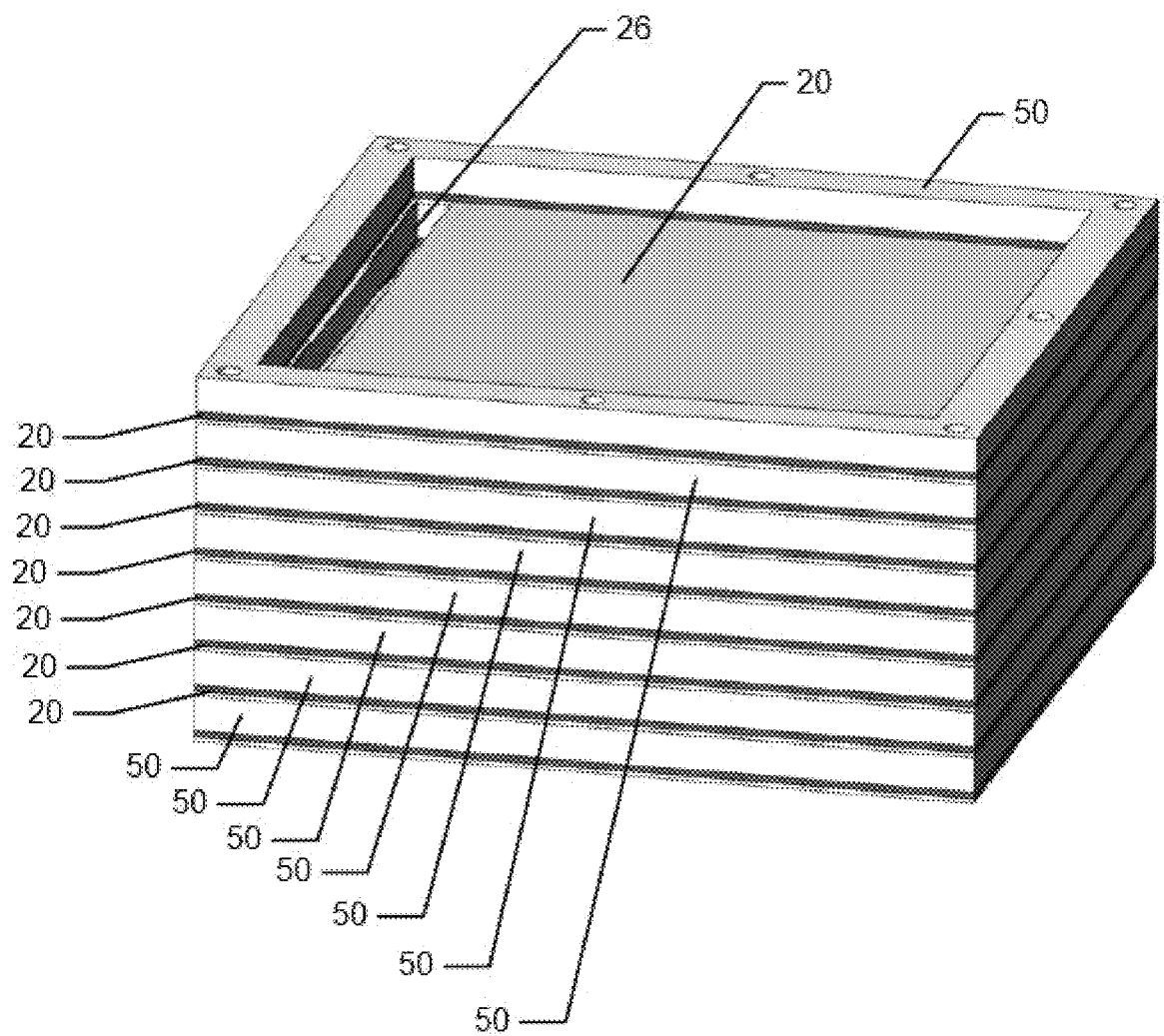
FIG. 12A illustrates a plurality of plates and a plurality of spacers stacked in the z-direction in accordance with example embodiments.
Figure 12B:
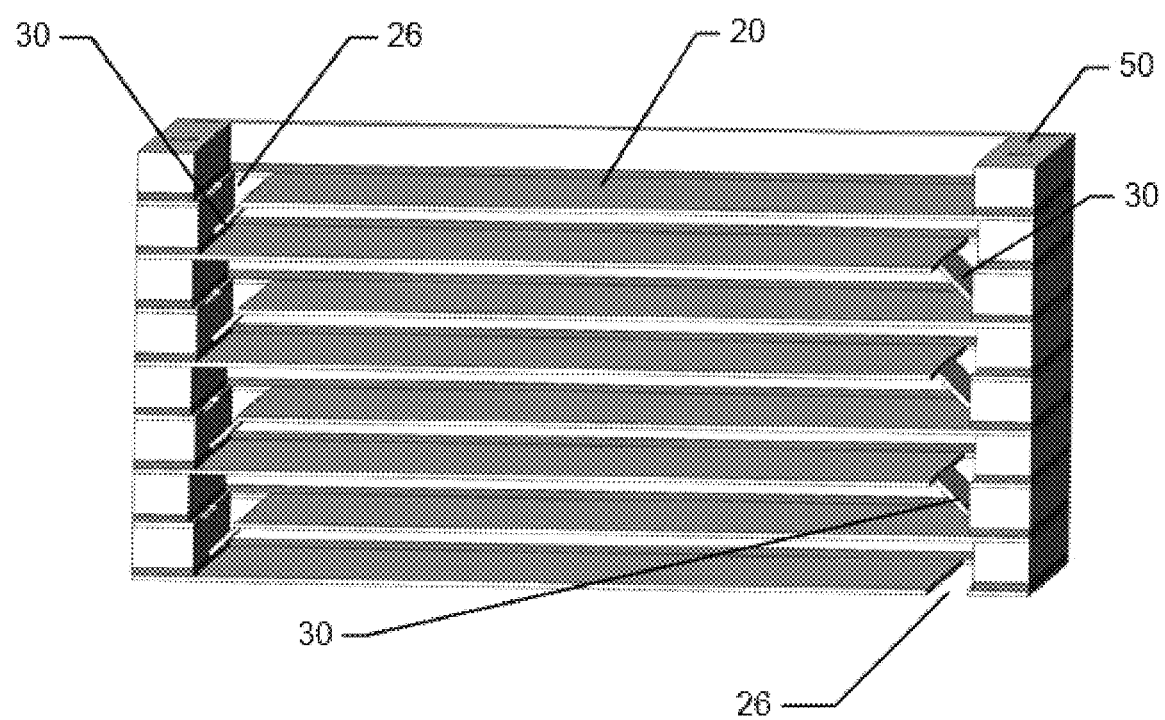
FIG. 12B illustrates a cross-sectional view of FIG. 12A in accordance with example embodiments.
Figure 13:
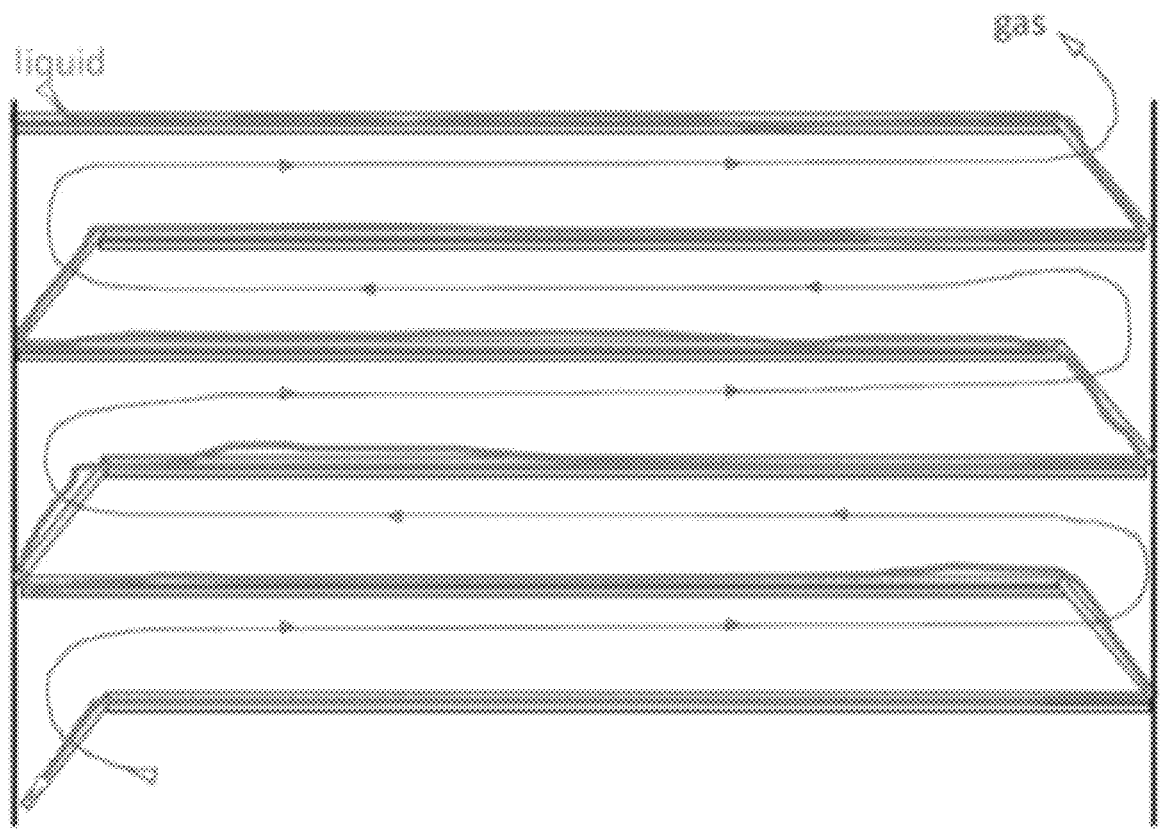
FIG. 13 is a schematic of a liquid phase flowing across the surface of a plate and down the respective descending ramps, while a vapor phase flows in an opposite direction in accordance with example embodiments.

FIG. 11A, for instance, illustrates an unassembled grouping of a spacer 50, an optional gasket 52, and a plate 20. FIG. 11B illustrates an assembled grouping of the spacer 50, the optional gasket 52, and the plate 20. FIG. 12A illustrates a plurality of plates 20 and a plurality of spacers 50 stacked in the z-direction. As shown in FIG. 12A, spacer 50 is located between two adjacent plates 20. FIG. 12B illustrates a cross-sectional view of FIG. 12A. FIG. 12B illustrates the alternating side-to-side location of the respective vapor openings 26 and respective descending ramps 30. In this regard, a liquid phase may be channeled from the top surface of the uppermost plate to the bottom plate via the continuous liquid channeling network defined by the respective liquid channeling network or plates and descending ramp. Meanwhile, a vapor phase entering the bottommost plate via vapor opening thereof can flow upwardly through stack of plates and spacers in a countercurrent flow path having a generally S-shaped path. FIG. 13, for instance, provides a schematic of a liquid phase flowing across the surface of the plates and down the respective descending ramps, while a vapor phase flows in an opposite direction.

In example embodiments, the distillation column includes a plurality of stages stacked in a z-direction, in which the plurality of stages include at least a first stage and a second stage. The first stage includes (i) a first plate and (ii) a first spacer located above a portion of a top surface of the first plate, and the second stage includes (i) a second plate and (ii) a second spacer located between a portion of a bottom surface of the first plate and a portion of a stop surface of the second plate. In example embodiments, the first plate includes a first base portion substantially located in a first x-y plane and includes a first opening proximate a first side of the distillation column and having a first-opening width. The second plate includes a second base portion substantially located in a second x-y plane and includes a second opening proximate a second side (e.g., opposite to the first side) of the distillation column and having a second-opening width. The first plate may further include a first descending ramp portion extending from the first base portion and having a first-ramp width that is less than the first-opening width. The first descending ramp portion may include a first elevated end adjacent or attached to the first base portion and a first descended end abutting a liquid feed location of the top surface of the second plate. The second plate may further include a second descending ramp portion extending from the second base portion and having a second-ramp width that is less than the second-opening width. The second descending ramp portion may include a second elevated end adjacent or attached to the second base portion and a second descended end. In example embodiments, the top surface of the first plate further include a first liquid channeling network and the top surface of the second plate further includes a second liquid channeling network, wherein the first liquid channeling network and the second liquid channeling network define a continuous liquid channeling network across a length of the first base portion, down the first descending ramp portion to the second base portion, across the second base portion, and down the second descending ramp portion.

In another aspect, example embodiments provide a system for distilling a fluid mixture including: (i) a distillation column including a plurality of alternating plates and spacers stacked in a z-direction, in which the distillation column further includes a first vapor outlet, a first liquid outlet, and a first vapor inlet; (ii) a boiler (e.g., reboiler) having a second liquid inlet and a second vapor outlet, in which the second liquid inlet is operatively connected to the first liquid outlet and the second vapor outlet is operatively connected to the first vapor inlet; (iii) a condenser having a third vapor inlet and a third liquid outlet, in which the third vapor inlet is operatively connected to the first vapor outlet; and (iv) the distillation column or the boiler further includes a first fluid mixture inlet, for example, to provide a fresh feed of the fluid mixture to the system from separation. For example, the distillation column may include the first fluid mixture inlet, the boiler (e.g., reboiler) may include the first fluid mixture inlet, or both. For instance, the distillation column may be configured to receive a fluid mixture, such as a feed mixture, and the boiler may also be configured to receive a fluid mixture, such as a feed mixture. For example, the boiler may be initially filled with a feed mixture at the onset of start-up, while fresh feed may be directed into the distillation column after the boiler has been filled and/or heated to a desired temperature. In example embodiments, one or more (e.g., each) of the plates include a respective liquid channeling network on a top surface thereof (e.g., formed therein or provided on top of the top surface), a respective vapor opening, and a respective descending ramp. In example embodiments, one or more (e.g., each) of the respective descending ramp abuts a respective liquid feed location of the plate immediately below to form a continuous liquid channeling network. In example embodiments, the respective vapor openings of adjacent plates are located on opposite sides of the distillation column and form a continuous S-shaped vapor channel defined by the plurality of alternating plates and spacers, and the respective vapor openings.

In example embodiments, the system for distilling a fluid mixture may include a rectifier system, in which fresh feed of a fluid mixture introduced into the system by addition to the boiler (e.g., reboiler). In example embodiments, the system may be operated as a batch process or a continuous process. In example embodiments, the system for distilling a fluid mixture may include a distillation column including a plurality of alternating plates and spacers stacked in a z-direction, in which the distillation column further includes a first vapor outlet, a first liquid outlet, and a first vapor inlet. In example embodiments, the system may include a boiler (e.g., reboiler) having a fluid mixture inlet (e.g., for fresh feed to the system), a second liquid inlet, and a second vapor outlet, wherein the second liquid inlet is operatively connected to the first liquid outlet and the second vapor outlet is operatively connected to the first vapor inlet. The system may also include a condenser having a third vapor inlet and a third liquid outlet, wherein the third vapor inlet is operatively connected to the first vapor outlet. In example embodiments, the plates include a respective liquid channeling network on a top surface thereof, a respective vapor opening, and a respective descending ramp, the respective descending ramp abuts a respective liquid feed location of the plate immediately below to form a continuous liquid channeling network, in which the respective vapor openings of adjacent plates are located on opposite sides of the distillation column and form a continuous S-shaped vapor channel defined by the plurality of alternating plates and spacers, and the respective vapor openings.

In example embodiments, the system for distilling a fluid mixture may include a distillation system, in which fresh feed of a fluid mixture may be introduced into the system by addition at one or more locations directly into the distillation column (e.g. one or more feed streams, which may be the same or different fluid mixture, provided to respective feed locations along the height of the column). In example embodiments, the system may be operated as a batch process or a continuous process. In example embodiments, the system for distilling a fluid mixture may include a distillation column including a plurality of alternating plates and spacers stacked in a z-direction, in which the distillation column further includes a first fluid mixture inlet (e.g., fresh feed inlet), a first vapor outlet, a first liquid outlet, and a first vapor inlet. The system may further include a boiler (e.g., reboiler) having a second liquid inlet and a second vapor outlet, wherein the second liquid inlet is operatively connected to the first liquid outlet and the second vapor outlet is operatively connected to the first vapor inlet. The system may further include a condenser having a third vapor inlet and a third liquid outlet, wherein the third vapor inlet is operatively connected to the first vapor outlet. In example embodiments, the plates may include a respective liquid channeling network on a top surface thereof, a respective vapor opening, and a respective descending ramp, in which a respective descending ramp may abut a respective liquid feed location of the plate immediately below to form a continuous liquid channeling network. In example embodiments, the respective vapor openings of adjacent plates are located on opposite sides of the distillation column and form a continuous S-shaped vapor channel defined by the plurality of alternating plates and spacers, and the respective vapor openings.

In example embodiments, the third liquid outlet of the condenser may be operatively connected to a first liquid inlet of the distillation column, in which the first liquid inlet of the distillation column is oriented to deposit condensed liquid from the condenser to an uppermost liquid feed location of an uppermost plate of the distillation column. In example embodiments, the first liquid inlet and the first vapor outlet may be located on opposite sides of the distillation column.

Figure 14:
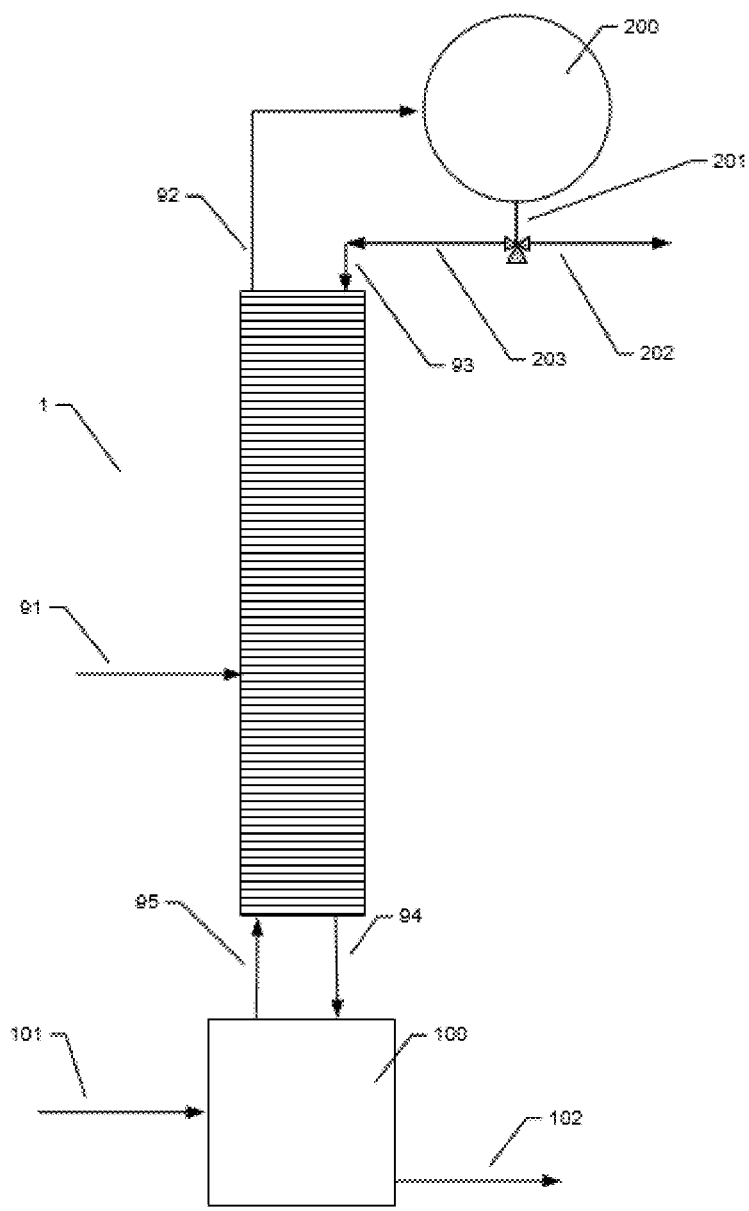
FIG. 14 illustrates a schematic of a system including a distillation column operatively connected to a reboiler and a condenser in example embodiments.

FIG. 14 illustrates a schematic of a system including a distillation column 1 operatively connected to a reboiler 100 and a condenser 200. The distillation column may optionally include a fresh feed inlet 91, an overhead vapor outlet 92 operatively connected to the condenser 200, a liquid reflux inlet 93 that receives condensed liquid from the condenser 200, a liquid phase outlet 94 at the bottom of the distillation column operatively connected to the reboiler 100, and a vapor phase inlet 95 operatively connected to the reboiler 100. In some example embodiments fresh feed inlet 91 may be liquid, gas, or biphasic and may be located at any stage of the column depending on the optimal location given the materials to be distilled. The reboiler 100 may optionally include a fresh feed inlet 101 and a bottom product exit or stream 102. In this regard, a vapor phase produced in the reboiler 100 exits the reboiler and enters the distillation column via the vapor phase inlet 95, while liquid phase from the distillation column enters the reboiler via the liquid phase outlet 94 of the distillation column. The condenser 200 receives the vapor phase exiting the distillation column, condenses at least a portion of the vapor phase, and provides a condensed liquid via exit 201. The exit 201 may be split into two or more separate streams, including a reflux stream 203 that introduces the condensed liquid back into the distillation column via the liquid reflux inlet 93 and a product or intermediate product stream 202.

Yet another embodiment provides a process of distilling a fluid mixture having a first percentage of a more volatile component and a first percentage of a less volatile component, in which the process includes providing a distillation column including a plurality of alternating plates and spacers stacked in a z-direction, in which one or more (e.g., each) of the plates include a respective liquid channeling network on a top surface thereof (e.g., formed therein or provided on top of the top surface), a respective vapor opening, and a respective descending ramp. In example embodiments, one or more (e.g., each) of the respective descending ramps abut a respective liquid feed location of the plate immediately below to form a continuous liquid channeling network. In example embodiments, the respective vapor openings of adjacent plates are located on opposite sides of the distillation column and form a continuous S-shaped vapor channel defined by the plurality of alternating plates and spacers, and the respective vapor openings. The process may also include flowing a vapor phase through the continuous S-shaped vapor channel in a first direction and flowing a liquid phase through the continuous liquid channeling network in a second direction, in which the second-direction is counter-current to the first direction. The process may also include vaporizing a portion of the more volatile component into the vapor phase forming a more volatile component rich vapor phase, and a portion of the less volatile component transferring into the liquid phase forming a less volatile component rich liquid phase. In example embodiments, the more volatile component rich vapor phase located at or proximate a top end of the distillation column has a second percentage of the more volatile component, in which the second percentage of the more volatile component is greater than the first percentage of the more volatile component.

FIG. 15 is a flowchart for a process 1500 of distilling a fluid mixture having a first percentage of a more volatile component and a first percentage of a less volatile component in accordance with example embodiments. As shown in FIG. 15, the process 1500 may include the following steps: (i) providing a distillation column comprising a plurality of alternating plates and spacers stacked in a z-direction, the plates comprising a respective liquid channeling network on a top surface thereof, a respective vapor opening, and a respective descending ramp; wherein the respective descending ramp abuts a respective liquid feed location of the plate immediately below to form a continuous liquid channeling network, wherein the respective vapor openings of adjacent plates are located on opposite sides of the distillation column and form a continuous S-shaped vapor channel defined by the plurality of alternating plates and spacers, and the respective vapor openings at operation 1502; (ii) flowing a vapor phase through the continuous S-shaped vapor channel in a first direction at operation 1504; (iii) flowing a liquid phase through the continuous liquid channeling network in a second direction, the second-direction being counter-current to the first direction at operation 1506; and (iv) vaporizing a portion of the more volatile component into the vapor phase forming a more volatile component rich vapor phase, and a portion of the less volatile component transferring into the liquid phase forming a less volatile component rich liquid phase; wherein the more volatile component rich vapor phase located at or proximate a top end of the distillation column has a second percentage of the more volatile component, the second percentage of the more volatile component is greater than the first percentage of the more volatile component at operation 1508.

In example embodiments, the process may include a step of maintaining a temperature gradient along a length (e.g., the entire length) of the distillation column, including a first temperature at the bottom end of the distillation column and a second temperature at the top end of the distillation column, wherein the first temperature is larger than the second temperature. The process may also include a step of forming a liquid phase within the distillation column by condensing a portion of the less volatile component from the vapor phase in response to maintaining a temperature gradient along the length of the distillation column, and flowing the liquid phase through the continuous liquid channeling network in a second direction towards the bottom end of the distillation column, wherein the second-direction being counter-current to the first direction.

In example embodiments, flowing the vapor phase through the continuous S-shaped vapor channel in a first direction includes maintaining an average superficial vapor velocity through the continuous S-shaped vapor channel of less than about 20 m/s, such as less than about any of the following: 20, 15, 10, 8, 6, 5, 4, 2, and 1 m/s. The average superficial velocity may be adjusted and/or controlled by modifying the vapor-rate produced from the boiler (e.g., reboiler), adjusting the temperature along the length of the distillation column, and/or varying the spacer height or thickness in the z-direction, in which a larger spacer height or thickness in the z-direction for a given vapor-rate produced from the boiler will reduce the superficial velocity of the vapor phase through the continuous S-shaped vapor channel. The average superficial velocity may also be adjusted and/or controlled by utilizing plates and/or liquid channeling networks that are wider and/or longer alone or in conjunction with modifying any of the aforementioned features. In example embodiments, the average superficial velocity may be controlled by utilizing a wider and/or longer liquid channeling network per plate. In one embodiment, a shorter spacer height or thickness in the z-direction improved system performance. For example, minimizing the superficial velocity of the vapor phase without increasing spacer height (e.g., vapor head space above a plate) may improve system performance.

In example embodiments, the process may include maintaining a pressure drop across a total length of the distillation column as defined as the distance from a lowermost plate to an uppermost plate of less than about 5 PSID such as less than about any of the following: 5, 4, 3, 2, 1, 0.5, 0.3, 0.1, and 0.05 PSID. In example embodiments, the process may include maintaining an average pressure drop across adjacent plates of less than about 0.5 PSID, such as at least about any of the following: 0.5, 0.4, 0.3. 0.2, 0.1, and 0.05 PSID. In example embodiments, the process may include maintaining a maximum pressure drop across each set of adjacent plates of less than about 0.5 PSID, such as at least about any of the following: 0.5, 0.4, 0.3. 0.2, 0.1, and 0.05 PSID.

In example embodiments, the process may include flowing a vapor phase through the continuous S-shaped vapor channel by maintaining a Stokes or laminar flow regime through the continuous S-shaped vapor channel. Flowing a vapor phase through the continuous S-shaped vapor channel, for example, may include maintaining an average Reynolds Number through the continuous S-shaped vapor channel of less than about 2300, such as less than about any of the following: 2200, 2000, 1800, 1600, 1500, 1400, 1200, 1000, 800, 600, 500, 400, 200, 100, 50, 25, 10, 5, 1, and 0.5. In example embodiments, the process may include flowing a vapor phase through the continuous S-shaped vapor channel by maintaining a Reynolds numbers below 100 or even into the Stokes regime (i.e., below Re=1). In example embodiments, a lower Reynolds number correlates to increased performance (e.g., mass transfer efficiency in terms of column height) at the expense of form factor (e.g., the distillation column may get bigger, that is mainly wider as opposed to taller in the z-direction) as velocity gets smaller. A user or operator, for example, can configure the distillation column in manner to achieve a desired in-between that allows the system to maintain a reasonable form factor and mass transfer efficiency by adjusting the number of plates utilized in the distillation column. (e.g., more mass transfer efficiency correlates to less plates).

In example embodiments, the process of distilling a fluid mixture having a first percentage of a more volatile component and a first percentage of a less volatile component may include a step of providing a distillation column including a first fluid mixture inlet, and a plurality of alternating plates and spacers stacked in a z-direction to define a top end and a bottom end of the distillation column, in which one or more (e.g., each) of the plates include a respective liquid channeling network on a top surface thereof, a respective vapor opening, and a respective descending ramp as disclosed and described herein. A respective descending ramp, for example, may abut a respective liquid feed location of the plate immediately below to form a continuous liquid channeling network, and wherein the respective vapor openings of adjacent plates are located on opposite sides of the distillation column and form a continuous S-shaped vapor channel defined by the plurality of alternating plates and spacers, and the respective vapor openings. The process may further include flowing a vapor phase through the continuous S-shaped vapor channel in a first direction and flowing a liquid phase through the continuous liquid channeling network in a second direction, in which the second-direction is counter-current to the first direction. The process may also include flowing the fluid mixture through the first fluid mixture inlet and vaporizing a portion of the more volatile component into the vapor phase forming a more volatile component rich vapor phase, and a portion of the less volatile component transferring into the liquid phase forming a less volatile component rich liquid phase. In this regard, the more volatile component rich vapor phase located at or proximate the top end of the distillation column has a second percentage of the more volatile component, in which the second percentage of the more volatile component is greater than the first percentage of the more volatile component. Additionally, the less volatile component rich liquid phase located at or proximate the bottom end of the distillation column has a third percentage of the less volatile component, in which the third percentage of the less volatile component is greater than the first percentage of the less volatile component.

In example embodiments, the process of distilling a fluid mixture having a first percentage of a more volatile component and a first percentage of a less volatile component may include a providing a distillation column including a plurality of alternating plates and spacers stacked in a z-direction to define a top end and a bottom end of the distillation column, in which the distillation column further includes a first vapor outlet, a first liquid outlet, and a first vapor inlet. As disclosed and described herein, one or more (e.g., each) of the plates may include a respective liquid channeling network on a top surface thereof, a respective vapor opening, and a respective descending ramp. In example embodiments, one or more (e.g., each) respective descending ramp may abut a respective liquid feed location of the plate immediately below to form a continuous liquid channeling network. The respective vapor openings of adjacent plates, in example embodiments, may be located on opposite sides of the distillation column and form a continuous S-shaped vapor channel defined by the plurality of alternating plates and spacers, and the respective vapor openings. The process may also include providing a boiler (e.g., reboiler) having a fluid mixture inlet (e.g., for introduction fresh feed), a second liquid inlet, and a second vapor outlet, wherein the second liquid inlet is operatively connected to the first liquid outlet and the second vapor outlet is operatively connected to the first vapor inlet. The process may also include flowing the fluid mixture through the fluid mixture inlet and into an interior region of the reboiler, and vaporizing a portion of the fluid mixture in the interior region of the reboiler to form a vapor phase and flowing the vapor phase through the continuous S-shaped vapor channel in a first direction towards the top end of the distillation column. A slower superficial vapor velocity generally will enhance distillation performance. In one example embodiment, the flowing of vapor phase through the continuous S-shaped vapor channel in a first direction includes maintaining an average superficial vapor velocity of less than about 10 m/s through the continuous S-shaped vapor channel. The process may further include a step of maintaining a temperature gradient along a length (e.g., the entire length) of the distillation column, including a first temperature at the bottom end of the distillation column and a second temperature at the top end of the distillation column, wherein the first temperature is larger than the second temperature. The process may also include a step of forming a liquid phase within the distillation column by condensing a portion of the less volatile component from the vapor phase in response to maintaining a temperature gradient along the length of the distillation column, and flowing the liquid phase through the continuous liquid channeling network in a second direction towards the bottom end of the distillation column, wherein the second-direction being counter-current to the first direction. In example embodiments, the vapor phase located at or proximate the top end of the distillation column has a second percentage of the more volatile component, and the second percentage of the more volatile component is greater than the first percentage of the more volatile component.

Yet another embodiment provides a method of assembling a distillation column, such as those disclosed and described herein. The of assembling a distillation column, for example, may include stacking a plurality of plates and spacers in a z-direction in an alternating configuration, wherein an individual plate is located between a pair of individual spacers. One or more (e.g., each) of the plates may include a respective liquid channeling network on a top surface thereof, a respective vapor opening, and a respective descending ramp. The method may include orienting the plurality of plates such that the respective vapor openings of adjacent plates are located on opposite sides of the distillation column and form a continuous S-shaped vapor channel defined by the plurality of alternating plates and spacers, and the respective vapor openings, such that the respective descending ramps of adjacent plates are locate on opposite sides of the distillation column and the respective descending ramp abuts a respective liquid feed location of the plate immediately below to form a continuous liquid channeling network having a zig-zag path that travels from side to side of the distillation column as the patch descends down the length of the distillation column (e.g., towards the bottom of the distillation column and/or towards a reboiler). In example embodiments, one or more of the spacers may include one or more ports formed therein (e.g., piping and/or valves) that enable quick connection of process piping to traditional heaters, coolers, pumps, and/or separate unit operations.

Yet another embodiment provides a method of operating a distillation column. For instance, the method of operating a distillation column may leverage the ease of adding and/or removing plates and/or spacers, varying the heights or thickness of the spacers in the z-direction, or modifying fresh feed inlet location along the length of the distillation column, which provides increased flexibility for use with multiple fluid mixtures systems. For example, a distillation column for use in a pilot plant may have a first configuration used to distill a first fluid mixture system, subsequently the distillation column may be modified as noted above (e.g., adding or removing plates, feed location, reflux location, etc.) to provide a second configuration for distillation of a second fluid mixture system or to improve performance of the distillation column of the first fluid mixture system, and running the distillation column while in the second configuration.

In example embodiments, the method of operating a distillation column may include distilling a first feed mixture via a distillation column having a first configuration, such as those disclosed and described herein, For example, the distillation column may have a plurality of alternating plates and spacers stacked in a z-direction, in which one or more (e.g., each) of the plates may include a respective liquid channeling network on a top surface thereof, a respective vapor opening, and a respective descending ramp. The respective descending ramp, for example, may abut a respective liquid feed location of the plate immediately below to form a continuous liquid channeling network. The respective vapor openings of adjacent plates may be located on opposite sides of the distillation column and form a continuous S-shaped vapor channel defined by the plurality of alternating plates and spacers, and the respective vapor openings. The method of operating a distillation column may include subsequent to distilling the first feed mixture, a step of modifying the distillation column by adjusting the number of plates, an average height of the spacers, and/or a feed inlet location along a length of the distillation column. The method may also include distilling a second feed mixture via the distillation column having the second configuration.

These and other modifications and variations to embodiments may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A distillation column, comprising:
a plurality of alternating plates and spacers stacked in a z-direction;
the plates comprising a respective liquid channeling network on a top surface thereof, a respective vapor opening, and a respective descending ramp including a respective ramp-liquid channeling network on a top ramp-surface thereof; wherein the respective descending ramps extend downward through the respective vapor openings and abut a respective liquid feed location of a plate immediately below to form a continuous liquid channeling network defined by the respective liquid channeling networks and the respective ramp-liquid channeling network;
the respective vapor openings of adjacent plates are located on opposite sides of the distillation column and form a continuous S-shaped vapor channel defined by the plurality of alternating plates and spacers, and the respective vapor openings, and wherein the continuous S-shaped vapor channel defines a respective vapor head space above and in contact with the top surface; and
wherein the continuous liquid channeling network and the continuous S-shaped vapor channel define a countercurrent flow configuration between a flow of a liquid phase and flow of a vapor phase through the distillation column during operation of the distillation column.

2. The distillation column of claim 1, wherein the respective liquid channeling network comprises a plurality of channels formed in the top surface, a mesh material disposed on the top surface, or a fabric material disposed on the top surface.

3. The distillation column of claim 1, wherein the respective liquid channeling network comprises a plurality of interconnected channels.

4. The distillation column of claim 1, wherein the respective liquid channeling network comprises a mesh material attached to the top surface.

5. The distillation column of claim 4, wherein the mesh material comprises a fiberglass mat of glass fibers, a stainless steel, or a nickel alloy.

6. The distillation column of claim 4, wherein the mesh material comprises a synthetic polymer.

7. The distillation column of claim 1, wherein the respective liquid channeling network comprises a fabric material attached to the top surface.

8. The distillation column of claim 1, wherein the respective vapor openings comprise a first vapor opening defining a first open area of a first plate, and wherein the respective descending ramps comprise a first descending ramp having a first ramp-area; wherein the first ramp-area is less than the first open area.

9. The distillation column of claim 1, wherein the respective vapor openings comprise an average open area, and wherein the respective descending ramps comprise an average descending ramp-area; wherein the average descending ramp-area is less than the average open area.

10. The distillation column of claim 9, wherein the average descending ramp-area comprises from about 5% to about 95% less area than the average open area.

11. The distillation column of claim 1, wherein one or more of the spacers include one or more ports therein.

12. A system for distilling a fluid mixture, comprising:
(i) a countercurrent distillation column including a plurality of alternating plates and spacers stacked in a z-direction, the distillation column further comprising a first vapor outlet, a first liquid outlet, and a first vapor inlet;
(ii) a boiler having a second liquid inlet and a second vapor outlet, wherein the second liquid inlet is operatively connected to the first liquid outlet and the second vapor outlet is operatively connected to the first vapor inlet; and
(iii) a condenser having a third vapor inlet and a third liquid outlet, wherein the third vapor inlet is operatively connected to the first vapor outlet;
wherein the distillation column or the boiler further comprises a first fluid mixture inlet; and the plates comprise a respective liquid channeling network on a top surface thereof, a respective vapor opening, and a respective descending ramp including a respective ramp-liquid channeling network on a top ramp-surface thereof, the respective descending ramps extend downward through the respective vapor openings and abut a respective liquid feed location of a plate immediately below to form a continuous liquid channeling network; and wherein the respective vapor openings of adjacent plates are located on opposite sides of the distillation column and form a continuous S-shaped vapor channel defined by the plurality of alternating plates and spacers, and the respective vapor openings, and wherein the continuous S-shaped vapor channel defines a respective vapor head space above and in contact with the top surface.

13. The system of claim 12, wherein distillation column includes the first fluid mixture inlet.

14. The system of claim 13, wherein boiler includes the first fluid mixture inlet.

15. The system of claim 12, wherein the third liquid outlet is operatively connected to a first liquid inlet of the distillation column.

16. The system of claim 15, wherein the first liquid inlet of the distillation column is oriented to deposit condensed liquid from the condenser to an uppermost liquid feed location of an uppermost plate of the distillation column.

17. The system of claim 16, wherein the first liquid inlet and the first vapor outlet are located on opposite sides of the distillation column.

* * * * *